United States Patent
Satou et al.

(10) Patent No.: US 12,289,543 B2
(45) Date of Patent: Apr. 29, 2025

(54) IMAGING DEVICE

(71) Applicant: Panasonic Intellectual Property Management Co., Ltd., Osaka (JP)

(72) Inventors: Yoshiaki Satou, Kyoto (JP); Yasuo Miyake, Osaka (JP); Yusuke Okada, Osaka (JP); Kazuko Nishimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/599,298

(22) Filed: Mar. 8, 2024

(65) Prior Publication Data
US 2024/0214700 A1    Jun. 27, 2024

Related U.S. Application Data

(63) Continuation of application No. PCT/JP2022/033862, filed on Sep. 9, 2022.

(30) Foreign Application Priority Data

Oct. 1, 2021 (JP) ................. 2021-162557

(51) Int. Cl.
*H04N 25/47* (2023.01)
*H04N 25/772* (2023.01)

(52) U.S. Cl.
CPC ........... *H04N 25/47* (2023.01); *H04N 25/772* (2023.01)

(58) Field of Classification Search
CPC ...... H04N 25/47; H04N 25/772; H04N 25/78; H04N 25/616
See application file for complete search history.

(56) References Cited

U.S. PATENT DOCUMENTS 6,476,864 B1   11/2002  Borg et al.
2005/0068431 A1*  3/2005  Mori ............... H04N 25/67
                                        348/241

(Continued)

FOREIGN PATENT DOCUMENTS

JP    11-355670    12/1999
JP    2007-194687   8/2007

(Continued)

OTHER PUBLICATIONS

International Search Report of PCT application No. PCT/JP2022/033862 dated Nov. 8, 2022.

*Primary Examiner* — Georgia Y Epps
*Assistant Examiner* — Monica T Taba
(74) *Attorney, Agent, or Firm* — Rimon P.C.

(57) ABSTRACT

An imaging device is provided with a pixel array section including multiple pixels arranged in a matrix of rows and columns, and a column signal processor. The multiple pixels include multiple imaging pixels that each output a pixel signal corresponding to incident light and multiple reference pixels which are aligned in the column direction in at least two columns and which each output a reset signal corresponding to the output signal at reset of each of the multiple first pixels. The column signal processor outputs the difference between the pixel signal outputted by one imaging pixel from among the multiple imaging pixels and a reference signal based on the reset signals outputted by at least two reference pixels, from among the multiple reference pixels, located in the same row as the one imaging pixel.

10 Claims, 23 Drawing Sheets

(56) References Cited

U.S. PATENT DOCUMENTS

| | | | | |
|---|---|---|---|---|
| 2005/0243193 A1* | 11/2005 | Gove | ................ | H04N 25/78 |
| | | | | 348/241 |
| 2013/0148000 A1* | 6/2013 | Murata | ............ | H04N 25/778 |
| | | | | 348/308 |
| 2015/0256771 A1 | 9/2015 | Shimura | | |
| 2016/0006966 A1* | 1/2016 | Murakami | ......... | H04N 25/78 |
| | | | | 348/308 |
| 2021/0144326 A1 | 5/2021 | Sato et al. | | |

FOREIGN PATENT DOCUMENTS

| | | |
|---|---|---|
| JP | 2010-536252 | 11/2010 |
| JP | 2011-151549 | 8/2011 |
| JP | 2015-170865 | 9/2015 |
| JP | 2016-019090 | 2/2016 |
| JP | 2017-139816 | 8/2017 |
| WO | 2007/099850 | 9/2007 |
| WO | 2009/035785 | 3/2009 |
| WO | 2019/193799 | 10/2019 |

\* cited by examiner

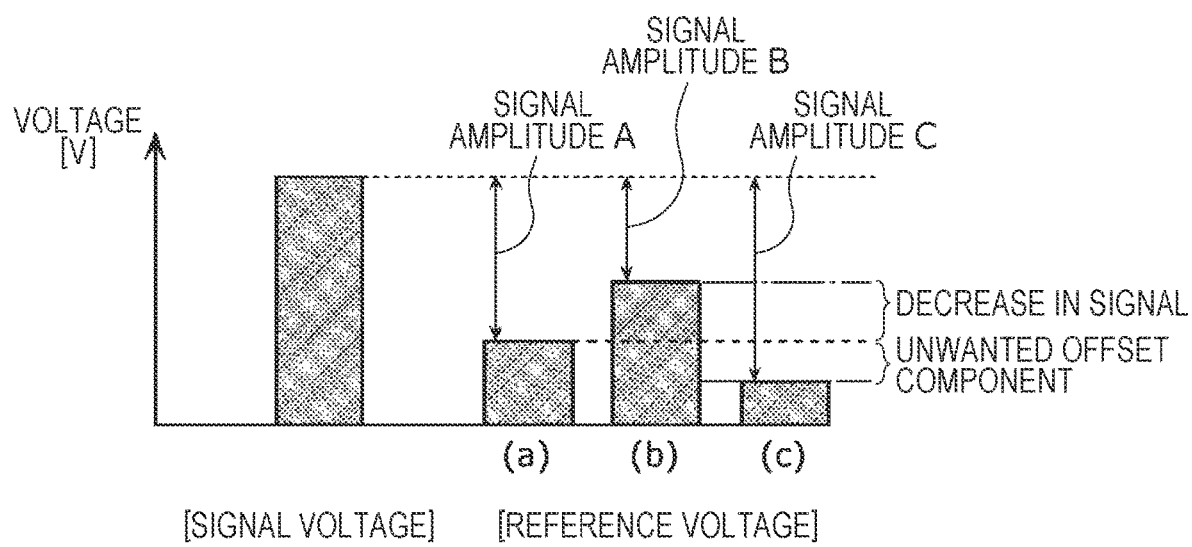

IMAGING DEVICE

BACKGROUND

1. Technical Field

The present disclosure relates to an imaging device.

2. Description of the Related Art

In general, the readout of a pixel signal from an imaging device is performed by destructive readout. Destructive readout is accompanied by a reset operation that empties the signal charge stored in the pixel. On the other hand, nondestructive readout is known as a pixel signal readout that reads out the signal charge in the exposed state without resetting the signal charge stored in the pixel. By performing nondestructive readout, pixel information can be obtained during exposure. Japanese Unexamined Patent Application Publication No. 2007-194687 discloses an imaging device that achieves high dynamic range by performing nondestructive readout.

SUMMARY

One non-limiting and exemplary embodiment provides image quality improvements in nondestructive readout.

In one general aspect, the techniques disclosed here feature an imaging device provided with: a plurality of pixels arranged in a matrix of rows and columns; and a signal processing circuit. The plurality of pixels include: a plurality of first pixels that each output a pixel signal corresponding to incident light; and a plurality of second pixels which are aligned in the column direction in at least two columns and which each output a reset signal corresponding to the output signal at reset of each of the plurality of first pixels, the plurality of second pixels being arranged in different columns from the plurality of first pixels. The signal processing circuit outputs the difference between the pixel signal outputted by one first pixel from among the plurality of first pixels and a reference signal based on the reset signals outputted by at least two second pixels, from among the plurality of second pixels, located in the same row as the one first pixel.

According to the present disclosure, the image quality in nondestructive readout can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram schematically illustrating signal amplitudes at the time of nondestructive readout.

DETAILED DESCRIPTIONS

Figure 1:
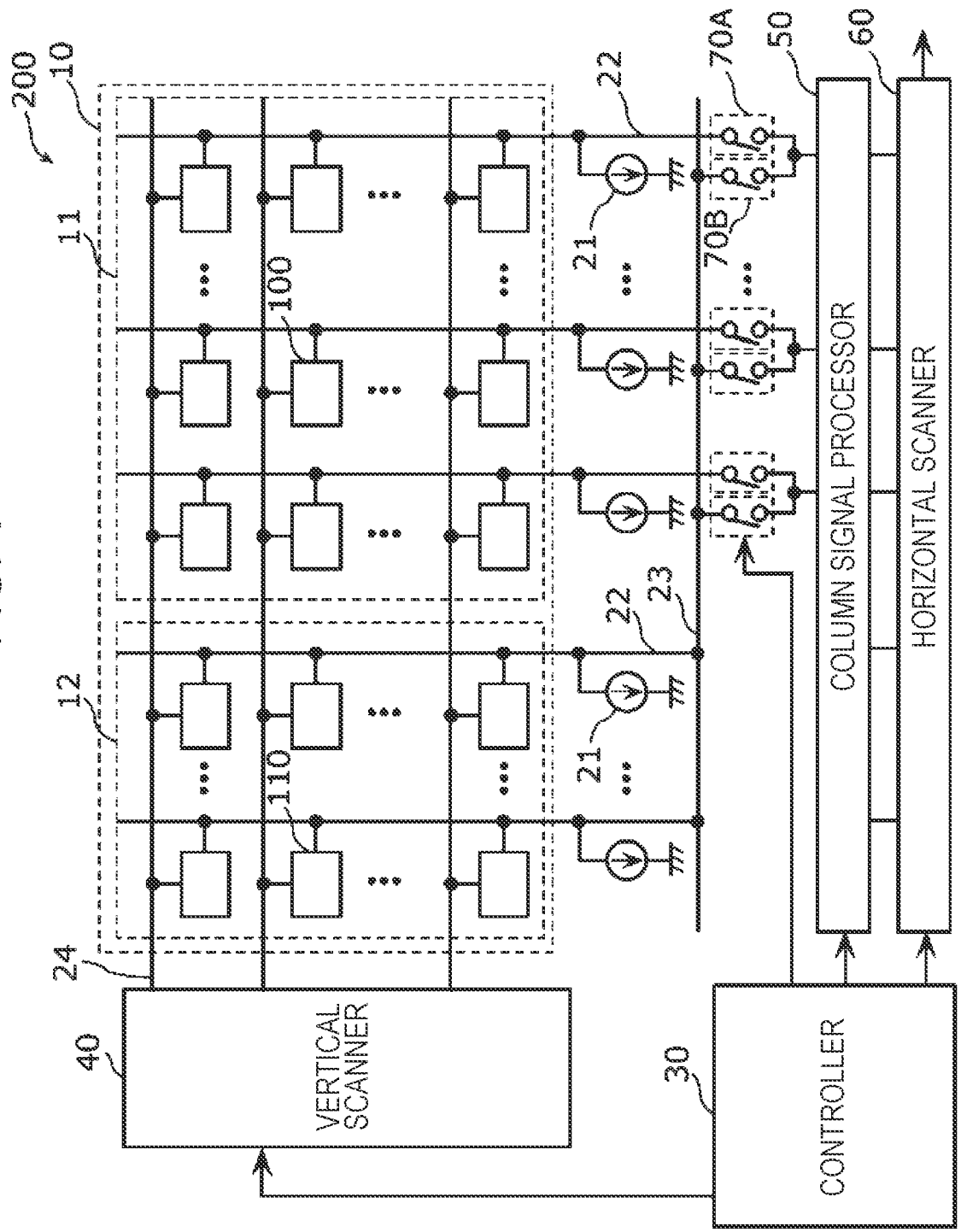
FIG. 1 is a block diagram illustrating an overall configuration of an imaging device according to Embodiment 1.

Underlying Knowledge Forming Basis of the Present Disclosure

As a technology related to the nondestructive readout described above, Japanese U.S. Pat. No. 6,459,025 discloses that high-speed nondestructive readout is achieved by taking the difference between a pixel signal outputted from a pixel and a reset signal outputted from a reference signal generator. The reference signal generator that outputs the reset signal is located in a vertical optical black (OB) area, for example. International Publication No. 2007/099850 discloses a configuration in which one reference pixel is provided on every row.

However, noise cannot be adequately reduced with the configurations disclosed in these cited documents. For example, if the reference pixels have variations and/or defects, fixed-pattern noise is generated and image quality is degraded. In particular, when the reference pixels are disposed at the ends of the pixel array section to make effective use of the pixel area, the possibility of pixel variations and/or defects increases. The inventors have studied the possibility of obtaining consistent, high-quality images, and have arrived at the configuration according to the present disclosure.

The following is an overview of aspects of the present disclosure.

An imaging device according to one aspect of the present disclosure is provided with: a plurality of pixels arranged in a matrix of rows and columns; and a signal processing circuit. The plurality of pixels include: a plurality of first pixels that each output a pixel signal corresponding to incident light; and a plurality of second pixels which are aligned in the column direction in at least two columns and which each output a reset signal corresponding to the output signal at reset of each of the plurality of first pixels, the plurality of second pixels being arranged in different columns from the plurality of first pixels. The signal processing circuit outputs the difference between the pixel signal outputted by one first pixel from among the plurality of first pixels and a reference signal based on the reset signals outputted by at least two second pixels, from among the plurality of second pixels, located in the same row as the one first pixel.

In this way, by using the reference signal based on the reset signals outputted by the second pixels located in the same row as the first pixel, nondestructive readout of the first pixel can be performed using a reference signal with reduced deviation from the voltage at reset of the first pixel due to the influence of the difference in the pixel position in the column direction. In addition, by using the reference signal based on the reset signals of at least two second pixels, the influence of defects can be reduced even there is a defect in one of the second pixels. Thus, the imaging device according to this aspect can improve the image quality in nondestructive readout.

Also, an imaging device according to one aspect of the present disclosure is provided with: a plurality of pixels arranged in a matrix of rows and columns; and a signal processing circuit. The plurality of pixels include: a plurality of first pixels that each output a pixel signal corresponding to incident light; and a plurality of second pixels which are aligned in the row direction in at least two rows and which each output a reset signal corresponding to the output signal at reset of each of the plurality of first pixels, the plurality of second pixels being arranged in different rows from the plurality of first pixels. The signal processing circuit outputs the difference between the pixel signal outputted by one first pixel from among the plurality of first pixels and a reference signal based on the reset signals outputted by at least two second pixels, from among the plurality of second pixels, located in the same column as the one first pixel.

In this way, by using the reference signal based on the reset signals outputted by the second pixels located in the same column as the first pixel, nondestructive readout of the first pixel can be performed using a reference signal with reduced deviation from the voltage at reset of the first pixel due to the influence of the difference in the pixel position in the row direction. In addition, by using the reference signal based on the reset signals of at least two second pixels, the influence of defects can be reduced even there is a defect in one of the second pixels. Thus, the imaging device according to this aspect can improve the image quality in nondestructive readout.

Additionally, for example, the reset signals outputted by the at least two second pixels may be combined and outputted to the signal processing circuit.

With this arrangement, a reference signal obtained from the combination of reset signals outputted by two or more second pixels can be used for nondestructive readout. Therefore, even if there is a defect in one of the second pixels, the influence of the defect can be reduced by averaging the reset signals.

Additionally, for example, the imaging device may be further provided with a selector circuit electrically connected to the at least two second pixels, and the selector circuit may select and output to the signal processing circuit at least one of the reset signals outputted by the at least two second pixels.

With this arrangement, at least one reset signal from among the reset signals outputted by two or more second pixels can be selected and used as a reference signal for nondestructive readout. Therefore, even if there is a defect in one of the second pixels, the influence of the defect can be reduced by selecting a reset signal outputted by a normal second pixel.

Additionally, for example, the imaging device may be further provided with a buffer circuit provided downstream of the at least two second pixels and upstream of the signal processing circuit.

This arrangement makes it possible to output a signal to the signal processing circuit with low impedance and furthermore increase the drive capability of the signal outputted to the signal processing circuit.

Additionally, for example, the imaging device may be further provided with an offset circuit provided downstream of the at least two second pixels and upstream of the signal processing circuit, and the offset circuit may output a signal obtained by adding a positive or negative voltage to an inputted signal to the signal processing circuit as the reference signal.

This enables fine adjustment of the reference signal by adding a voltage, even when the reset signals outputted by the second pixels have a deviation from the voltage of the first pixel after the reset operation.

Additionally, for example, each of the pixels may include a photoelectric converter that converts light into signal charge, and each of the second pixels may include a light shield that blocks light from entering the photoelectric converter.

This allows the configurations of the first and second pixels to be similar, thus reducing the difference between the reset signals and the voltage at reset of the first pixel.

Additionally, for example, each of the first pixels may include a photoelectric converter that converts light into signal charge, and each of the second pixels may not include a photoelectric converter that converts light into signal charge.

This arrangement allows for the second pixels to output reset signals without providing a light-shielding layer or other mechanism to prevent light from entering the photoelectric conversion element, thereby simplifying the configuration of the second pixels and increasing the degree of freedom in the layout of the second pixels.

Also, an imaging device according to one aspect of the present disclosure is provided with: a plurality of pixels arranged in a matrix of rows and columns; and a signal processing circuit. The plurality of pixels include: a plurality of first pixels that each output a pixel signal corresponding to incident light; a plurality of second pixels which are aligned in the column direction in at least one column and which each output a first reset signal corresponding to the output signal at reset of each of the plurality of first pixels, the plurality of second pixels being arranged in a different column from the plurality of first pixels; and a plurality of third pixels which are aligned in the row direction in at least one row and which each output a second reset signal corresponding to the output signal at reset of each of the plurality of first pixels, the plurality of third pixels being arranged in a different row from the plurality of first pixels. The signal processing circuit outputs the difference between the pixel signal outputted by one first pixel from among the plurality of first pixels and a reference signal based on the first reset signal outputted by at least one second pixel, from among the plurality of second pixels, located in the same row as the one first pixel and the second reset signal outputted by at least one third pixel, from among the plurality of third pixels, located in the same column as the one first pixel.

In this way, by using the reference signal based on the first reset signal outputted by a second pixel located in the same row as the first pixel and the second reset signal outputted by a third pixel located in the same column as the first pixel, nondestructive readout of the first pixel can be performed using a reference signal with reduced deviation from the voltage at reset of the first pixel due to the influence of differences in the pixel position in the row and column directions. In addition, by using the reference signal based on the first reset signal of a second pixel and the second reset signal of a third pixel, the influence of defects can be reduced even if there is a defect in the second pixel or the third pixel. Thus, the imaging device according to this aspect can improve the image quality in nondestructive readout.

Additionally, for example, the plurality of pixels may further include at least one fourth pixel which is located in the same column as the at least one second pixel and in the same row as the at least one third pixel, and which outputs a third reset signal corresponding to the output signal at reset of each of the plurality of first pixels, and the signal processing circuit may output the difference between the pixel signal outputted by the one first pixel and a reference signal based on the first reset signal outputted by the at least one second pixel, the second reset signal outputted by the at least one third pixel, and the third reset signal outputted by the at least one fourth pixel.

With this arrangement, by using the reference signal based on the first and second reset signals in addition to the third reset signal outputted by the fourth pixel located in the same column as the second pixel and in the same row as the third pixel, the influence of difference in the pixel position between the first and second pixels in the row direction and the difference in the pixel position between the first and third pixels in the column direction can be reduced.

Hereinafter, embodiments of the present disclosure will be described in detail and with reference to the drawings. Note that the embodiments described hereinafter all illustrate general or specific examples. Features such as numerical values, shapes, materials, structural elements, arrangements and connection states of structural elements, processing details, and the ordering of processing indicated in the following embodiments are merely examples, and are not intended to limit the present disclosure. The various aspects described in this specification may also be combined with each other in non-contradictory ways. In addition, among the structural elements in the following embodiments, structural elements that are not described in the independent claims are described as arbitrary or optional structural elements. In the following description, structural elements having substantially the same functions will be denoted by common reference signs, and the description of such structural elements may be reduced or omitted.

In this specification, terms indicating relationships between elements, terms indicating shapes of elements, and numerical ranges are not expressions that express strict meaning only, but rather are expressions that also include a range of substantial equality, such as a difference of a few percent, for example. Also, each diagram is a schematic diagram, and does not necessarily illustrate a strict representation.

In this specification, unless otherwise noted, ordinal numerals such as "first" and "second" do not mean the number or order of structural elements, but are used to avoid confusion between structural elements of the same type and to distinguish structural elements.

In this specification, "connection" in the description of a circuit configuration means electrical connection unless otherwise noted.

Embodiment 1

The following describes Embodiment 1.

Overall Configuration

FIG. 1 is a block diagram illustrating an overall configuration of an imaging device 200 according to Embodiment 1. First, the overall configuration of the imaging device 200 will be described with reference to FIG. 1.

As illustrated in FIG. 1, the imaging device 200 is provided with a pixel array section 10 including an imaging pixel section 11 and a reference pixel section 12, a controller 30, a vertical scanner 40, a column signal processor 50, a horizontal scanner 60, a first switch section 70A, and a second switch section 70B.

The imaging device 200 is also provided with a current source 21 and vertical signal line 22 disposed in each pixel column in the pixel array section 10, an output signal line 23, and a scanning line 24 disposed in each pixel row of the pixel array section 10.

The pixel array section 10 is a pixel section including multiple pixels arranged in a matrix of rows and columns. In other words, in the pixel array section 10, multiple pixels are aligned along column and row directions. The column direction is the direction in which the vertical signal lines 22 extend in FIG. 1, and is also referred to as the "vertical direction". The row direction is the direction in which the scanning lines 24 extend in FIG. 1, and is also referred to as the "row direction".

The pixels included in the pixel array section 10 include multiple imaging pixels 100 and multiple reference pixels 110. In the present embodiment, the imaging pixel 100 is an example of a first pixel, and the reference pixel 110 is an example of a second pixel. Each of the imaging pixels 100 outputs a pixel signal corresponding to incident light on the imaging pixels 100. Each of the reference pixels 110 outputs a reset signal corresponding to the output signal at reset of each of the imaging pixels 100. The reset signals outputted by the reference pixels 110 are signals that simulate the voltages of the imaging pixels 100 after the reset operation.

The imaging pixel section 11 is a pixel section in which the imaging pixels 100 are arranged in a matrix of rows and columns.

The reference pixel section 12 is a pixel section in which multiple reference pixels 110 are arranged in a matrix of rows and columns. The reference pixel section 12 is disposed at an end of the pixel array section 10 in the row direction, for example. The reference pixel section 12 is located on the row-direction side of the imaging pixel section 11. In other words, in the pixel array section 10, the imaging pixel section 11 and the reference pixel section 12 are arranged along the row direction.

In the pixel array section 10, the multiple reference pixels 110 are disposed in different columns than the multiple imaging pixels 100, and are aligned in the column direction in at least two columns. Hereinafter, a pixel column containing multiple reference pixels 110 aligned in the column direction in the reference pixel section 12 may be referred to as a "reference pixel column". In other words, the reference pixel section 12 includes multiple reference pixel columns. The number of imaging pixels 100 arranged in the column direction in the imaging pixel section 11 and the number of reference pixels 110 arranged in the column direction in the reference pixel section 12 are the same.

The current source 21 is connected to the vertical signal line 22 and is disposed in correspondence with the vertical signal line 22. In other words, one current source 21 is connected to each vertical signal line 22. The current source 21, together with an amplifying transistor included in the imaging pixel 100 or the reference pixel 110, forms a source follower circuit and functions to amplify the voltage corresponding to the charge stored in the imaging pixel 100 or the reference pixel 110.

The vertical signal line 22 is provided in correspondence with each pixel column in the pixel array section 10, and is connected to each of the imaging pixels 100 or reference pixels 110 in the same pixel column of the pixel array section 10.

The vertical signal lines 22 corresponding to the reference pixel columns connected to the reference pixels 110 in the reference pixel section 12 are connected to each other via the output signal line 23. The output signal line 23 is connected to the second switch section 70B. By having the output signal line 23 connect the vertical signal lines 22 corresponding to the reference pixel columns to each other, reset signals outputted by the reference pixels 110 are combined and outputted to the column signal processor 50 as a reference signal.

The scanning line 24 is provided in correspondence with each pixel row of the pixel array section 10, and is connected to each of the imaging pixels 100 and reference pixels 110 in the same pixel row of the pixel array section 10. The scanning line 24 is also connected to the vertical scanner 40.

Note that one scanning line 24 is illustrated for each pixel row in FIG. 1 for convenience, but the scanning line 24 may also include multiple signal lines.

The vertical scanner 40 functions to apply predetermined voltages to the scanning lines 24 to thereby control reset operations, charge storage operations, and readout operations on the imaging pixels 100 and the reference pixels 110 in units of pixel rows of the pixel array section 10.

The column signal processor 50 generates a difference signal between a pixel signal outputted from an imaging pixel 100 and a signal corresponding to the output signal at reset of that imaging pixel 100, or a difference signal between a pixel signal outputted from an imaging pixel 100 and a reference signal based on a reset signal outputted from a reference pixel 110 in the reference pixel section 12 connected via the second switch section 70B. The column signal processor 50 also performs processing such as gain application and AD conversion on the difference signal, and outputs the difference signal according to an instruction from the horizontal scanner 60 described later. The column signal processor 50 is an example of a signal processing circuit.

The first switch section 70A toggles the input and cutoff of pixel signals from the imaging pixels 100 to the column signal processor 50. One end of the first switch section 70A is connected to the vertical signal line 22 connected to the imaging pixels 100 in the imaging pixel section 11. The other end of the first switch section 70A is connected to the column signal processor 50. The first switch section 70A is disposed in correspondence with the vertical signal line 22 in each pixel column in the imaging pixel section 11.

The second switch section 70B toggles the input and cutoff of reference signals from the reference pixels 110 to the column signal processor 50. One end of the second switch section 70B is connected to the vertical signal line 22 connected to the reference pixels 110 in the reference pixel section 12 via the output signal line 23. The other end of the second switch section 70B is connected to the column signal processor 50. The second switch section 70B forms a pair with the first switch section 70A and is disposed in correspondence with the vertical signal line 22 in each pixel column in the imaging pixel section 11.

The horizontal scanner 60 functions to sequentially select one row's worth of the above difference signals held in the column signal processor 50 and read out the difference signals to an output circuit (not illustrated) disposed on the output side of the column signal processor 50.

The controller 30 is a control circuit that controls each component by supplying various control signals to the vertical scanner 40, the column signal processor 50, the horizontal scanner 60, the first switch section 70A, and the second switch section 70B, for example.

Pixel Circuit Configuration

The following describes the circuit configurations of the imaging pixel 100 and the reference pixel 110.

Figure 2:
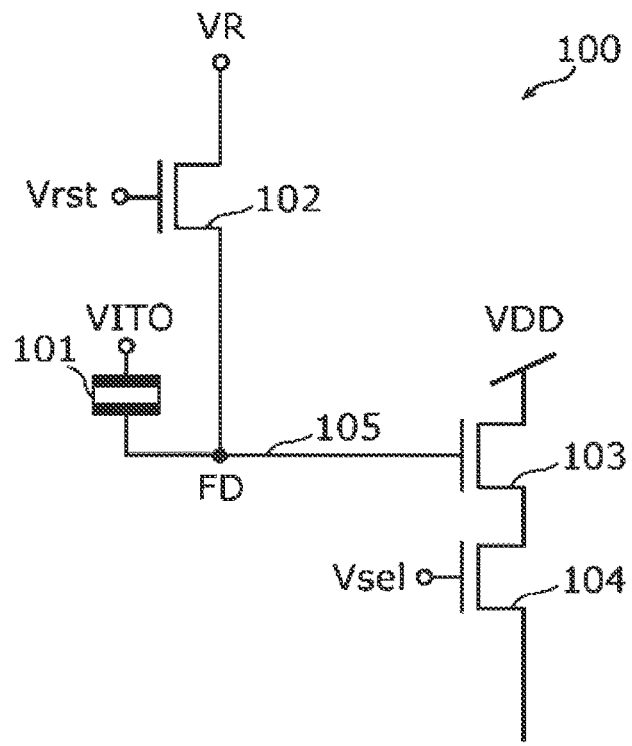
FIG. 2 is a diagram illustrating an example of the circuit configuration of an imaging pixel according to Embodiment 1.

First, the circuit configuration of the imaging pixel 100 will be described. FIG. 2 is a diagram illustrating an example of the circuit configuration of the imaging pixel 100 according to Embodiment 1. The imaging pixel 100 includes a photoelectric conversion element 101, a reset transistor 102, an amplifying transistor 103, a select transistor 104, and charge storage 105.

The photoelectric conversion element 101 is a photoelectric converter that photoelectrically converts incident light to signal charge. The signal charge is a quantity of holes or electrons, for example. The following describes the case in which the signal charge is a quantity of holes, but the signal charge may also be a quantity of electrons. Specifically, the photoelectric conversion element 101 has a top electrode, a bottom electrode, and a photoelectric conversion film sandwiched between the top and bottom electrodes, for example. The photoelectric conversion film contains organic molecules with strong light absorption, for example. The thickness of the photoelectric conversion film is approximately 500 nm, for example. The photoelectric conversion film is formed by spin coating or vacuum deposition, for example. The organic molecules have a high light absorption function over the entire visible light range of wavelengths from approximately 400 nm to approximately 700 nm. Pairs of holes and electrons are generated in the photoelectric conversion film due to the incidence of light, and when a bias voltage is applied between the top and bottom electrodes, one of either the holes or the electrons is collected on the top electrode and the other is collected on the bottom electrode. Note that the photoelectric conversion element included in the imaging pixel 100 according to the present embodiment is not limited to being formed from the organic photoelectric conversion film described above, and may also be a photodiode formed from an organic material, for example.

The charge storage 105 is connected to the photoelectric conversion element 101 and stores the signal charge that the photoelectric conversion element 101 generates. Signal charge corresponding to the incidence of light on the imaging pixel 100 is stored in the charge storage 105. The charge storage 105 is also called a "floating diffusion node (FD)".

The amplifying transistor 103 has a gate connected to the charge storage 105, a drain to which a power supply voltage VDD is supplied, and a source connected to the drain of the select transistor 104. With this arrangement, the amplifying transistor 103, together with the current source 21 illustrated in FIG. 1, forms a source follower circuit when the select transistor 104 is in a conducting state. At this time, the source of the amplifying transistor 103 outputs a signal corresponding to the quantity of signal charge stored in the charge storage 105 to the vertical signal line 22 via the select transistor 104.

The select transistor 104 has a drain connected to the source of the amplifying transistor 103, a source connected to the vertical signal line 22, and a gate connected to a select control signal line included in the scanning line 24. A select control signal Vsel is supplied to the gate of the select transistor 104 from the select control signal line. When the select control signal Vsel is high level, the select transistor 104 goes to a conducting state and outputs a pixel signal from the amplifying transistor 103 to the vertical signal line 22. When the select control signal Vsel is low level, the select transistor 104 goes to a non-conducting state and isolates the amplifying transistor 103 and the vertical signal line 22 from each other.

The reset transistor 102 has a drain to which a reset voltage VR is supplied, a source connected to the charge storage 105, and a gate connected to a reset control signal line included in the scanning line 24. A reset control signal Vrst is supplied to the gate of the reset transistor 102 from the reset control signal line. When the reset control signal Vrst is high level, the reset transistor 102 enters a conducting state and resets the potential of the charge storage 105 to the reset voltage VR.

Figure 3:
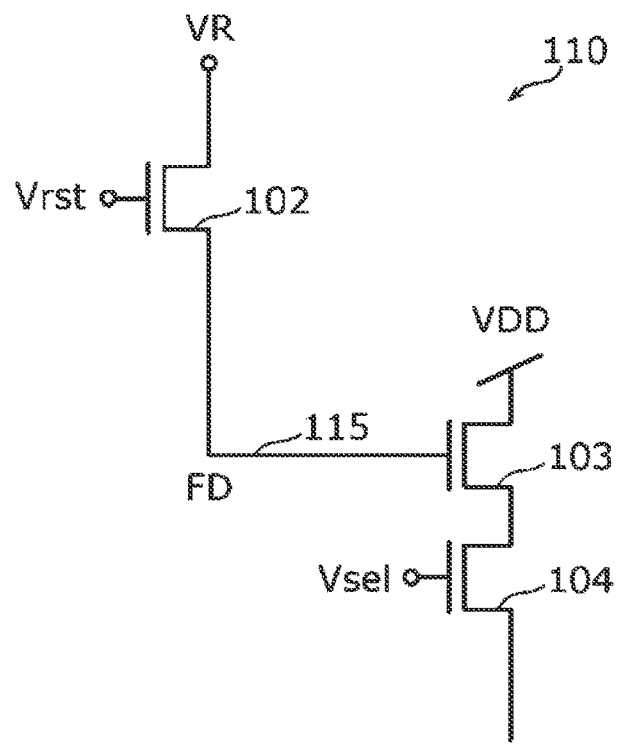
FIG. 3 is a diagram illustrating an example of the circuit configuration of a reference pixel according to Embodiment 1.

Next, the circuit configuration of the reference pixel 110 will be described. FIG. 3 is a diagram illustrating an example of the circuit configuration of the reference pixel 110 according to Embodiment 1. Description will be omitted for the portions of the configuration which are the same as the imaging pixel 100.

The reference pixel 110 includes a reset transistor 102, an amplifying transistor 103, a select transistor 104, and charge storage 115, for example. The reference pixel 110 differs from the imaging pixel 100 by being provided with the charge storage 115 instead of the charge storage 105, and by not including a photoelectric conversion element 101 connected to the charge storage 115.

Not including a photoelectric conversion element 101 means not including a photoelectric conversion element 101 connected to the charge storage 115. In other words, the reference pixel 110 may simply be configured such that the charge storage 115 and the photoelectric conversion element 101 are not connected, and signal charge from the photoelectric conversion element 101 is not stored in the charge storage 115. The reference pixel 110 may be configured such that a photoelectric conversion element 101 lacking a connection to the charge storage 115 is provided in the area where the reference pixel 110 is formed, or such that a photoelectric conversion element 101 is not provided in the area where the reference pixel 110 is formed.

The source of the amplifying transistor 103 of the reference pixel 110 outputs a signal corresponding to the quantity of signal charge stored in the charge storage 115 to the vertical signal line 22 via the select transistor 104. Since the reference pixel 110 does not include a photoelectric conversion element 101, the potential of the charge storage 115 does not change in response to the incidence of light on the reference pixel 110. Therefore, the reference pixel 110 is capable of outputting a reset signal corresponding to the output signal according to the voltage of the charge storage 105 that is not storing the signal charge generated by the photoelectric conversion element 101 of the imaging pixel 100 after a reset operation, regardless of the state of light illumination. For example, since the reset voltage VR is also supplied to the reset transistor 102 in the reference pixel 110 in a manner similar to the imaging pixel 100, the reference pixel 110 can output, as a reset signal to the vertical signal line 22, a signal according to the voltage when the charge storage 115 is reset to the reset voltage VR. Moreover, the reference pixel 110 with such a configuration can output a reset signal without providing a mechanism to prevent light from entering the photoelectric conversion element 101, such as the light-shielding layer described below. Therefore, the configuration of the reference pixel 110 can be simplified and the degree of freedom in the layout of the reference pixel 110 can be increased.

Note that in some cases, a light-shielding pixel with a light-shielding layer provided on the light-incident side of the photoelectric conversion element 101 of the pixel, referred to as an OB pixel, may be provided in the pixel array section 10. The light-shielding layer is an example of a light shield. In cases where the reference pixel 110 includes a light-shielding layer that blocks light from entering the photoelectric conversion element 101 in a manner similar to an OB pixel, the reference pixel 110 may have the same pixel circuit configuration as the imaging pixel 100. In other words, each of the pixels in the pixel array section 10, namely the imaging pixels 100 and the reference pixels 110, may include the photoelectric conversion element 101, and each of the reference pixels 110 may include the light-shielding layer. This allows the configurations of the reference pixels 110 and the imaging pixels 100 to be similar, thus reducing the difference between the reset signals and the voltage at reset of the imaging pixels 100.

Signal Readout Operation

The following describes a signal readout operation in the imaging device 200.

The imaging pixel 100 outputs a pixel signal nondestructively without an accompanying reset operation, for example. In other words, partway through a storage period during which the signal charge generated by the photoelectric conversion element 101 is stored in the charge storage 105, the imaging pixel 100 outputs a pixel signal corresponding to the quantity of signal charge stored at that time, without resetting the stored signal charge. Such a readout operation without an accompanying reset operation is called nondestructive readout. Nondestructive readout can also be performed multiple times in a single frame period.

Also, after the storage period has elapsed, the imaging pixel 100 outputs a pixel signal corresponding to the quantity of signal charge stored over the duration of the entire storage period. Thereafter, the stored signal charge is reset to the reset voltage VR, and the imaging pixel 100 outputs a signal corresponding to the reset voltage VR. Such a readout operation with an accompanying reset operation is called destructive readout.

Problems with nondestructive readout will be described.

As described above, the readout of a pixel by destructive readout obtains the signal as the difference between the output voltage of the pixel in a state in which the signal charge has been stored and the output voltage after the reset operation. On the other hand, in nondestructive readout, the pixel is in the state of storing the signal charge, and therefore a reset operation cannot be performed. Accordingly, the signal is obtained as the difference between a certain reference voltage and the output voltage of the pixel. The reference voltage determines the zero level of the signal. Therefore, when there is a difference from the actual zero level, that is, the voltage of the pixel after the reset operation, the signal may be decreased or an unwanted offset may be added, which compresses the signal range.

The following uses FIG. 4 to describe differences in signal amplitudes when there is a difference from the reference voltage of a pixel. FIG. 4 is a diagram schematically illustrating signal amplitudes at the time of nondestructive readout. The vertical direction in FIG. 4 represents the voltage outputted to the vertical signal line. Each graph in FIG. 4 illustrates the signal voltage at stored signal readout and reference voltages of a pixel, these voltages being inputted into the column signal processor. The signal amplitudes are the differences between the signal voltage and the reference voltages. In [Reference Voltage] of FIG. 4, graphs of three patterns (a), (b), and (c) are illustrated as the reference voltages. Pattern (a) indicates the case where the reference voltage is the voltage at destructive readout of the target pixel, or in other words, the voltage of the target pixel after the reset operation. Pattern (b) indicates the case where the reference voltage is high with respect to (a). Pattern (c) indicates the case where the reference voltage is low with respect to (a).

The signal amplitude A in the case where the reference voltage is (a) is the original signal level. In contrast, in the signal amplitude B in the case where the reference voltage is (b), which is higher than (a), low signal levels are crushed and the signal amplitude is decreased. Also, in the signal amplitude C in the case where the reference voltage is (c), which is lower than (a), an unwanted offset component is generated. For this reason, image contrast is lowered. In particular, when the gain of the imaging device is increased, such as when shooting in low-light environments, the signal amplitudes that can be handled become small, and therefore such signal decreases and offset components cause significant image quality degradation.

The voltage of a pixel after a reset operation may also be different depending on the position of the pixel in some cases.

Figure 5A:
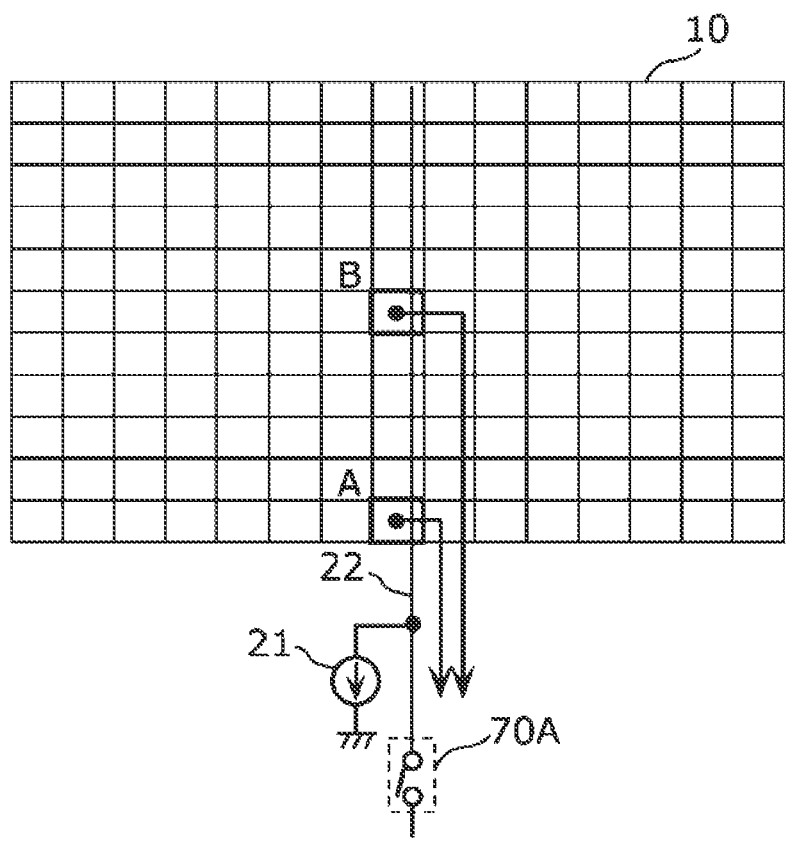
FIG. 5A is a diagram for explaining the positions of pixels to read out.
Figure 5B:
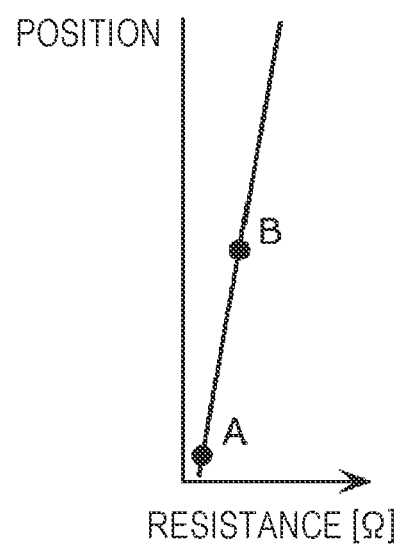
FIG. 5B is a diagram illustrating the difference in resistance at different positions of pixels to read out.
Figure 5C:
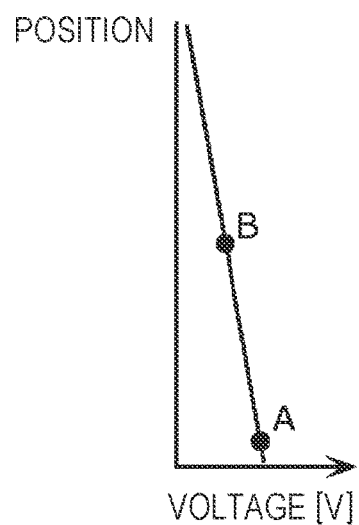
FIG. 5C is a diagram illustrating the difference in voltage at different positions of pixels to read out.
Figure 5D:
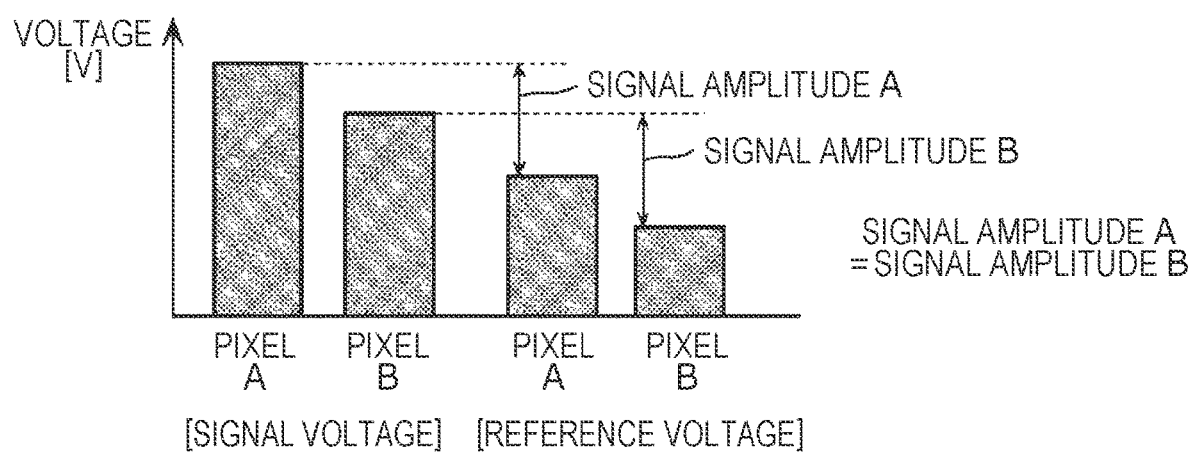
FIG. 5D is a diagram illustrating the difference in signal amplitude at different positions of pixels to read out.

FIG. 5A is a diagram for explaining the positions of pixels to read out. FIG. 5B is a diagram illustrating the difference in resistance at different positions of pixels to read out. FIG. 5C is a diagram illustrating the difference in voltage at different positions of pixels to read out. FIG. 5D is a diagram illustrating the difference in signal amplitude at different positions of pixels to read out. Note that FIGS. 5B and 5C illustrate the differences in resistance and voltage, respectively, when starting from the input of the first switch section 70A.

As illustrated in FIG. 5A, pixels A and B are connected to the same vertical signal line 22 and have different positions in the vertical direction. Since the vertical signal line 22 has a fixed interconnection resistance, the resistance value is different depending on the position of the pixel, as illustrated in FIG. 5B. The resistance value of the pixel B farther from the input of the first switch section 70A is higher than the resistance value of the pixel A. Also, since the signal voltage is read out while passing a constant current through the vertical signal line 22 with the current source 21, a voltage change corresponding to the interconnection resistance occurs, as illustrated in FIG. 5C. The voltage of the pixel B farther from the input of the first switch section 70A has a larger voltage drop, and thus becomes lower than the voltage of the pixel A. Accordingly, as illustrated in FIG. 5D, the voltage at reset (voltage indicated by [Reference Voltage] in FIG. 5D) is different between the pixel A and the pixel B, and the signal voltage is also different for the same signal amplitude, that is, even when signal amplitude A=signal amplitude B. In this case, if the same, fixed reference voltage is used for the pixel A and the pixel B, the signal amplitude will change between the pixel A and the pixel B.

Differences in the positions of pixels in the vertical direction are described in FIGS. 5A to 5D, but in some cases the voltage at reset is also different depending on the positions of pixels in the horizontal direction, due to factors such as the resistance being different between the vertical signal lines 22.

In the present embodiment, the imaging device 200 is provided with the reference pixel section 12 that includes the reference pixel columns for generating reference voltages corresponding to the imaging pixels 100 included in the imaging pixel section 11. In other words, in the present embodiment, voltages based on the reset signals of the reference pixels 110 are used as the reference voltages. Using the signals of the reference pixels 110 in the same row as the imaging pixels 100 in the selected row in the pixel array section 10 achieves readout in which the influence of differences in the voltage at reset in the vertical direction of the pixels as above is reduced.

Also, defects in the reference pixels 110 in the reference pixel section 12 and/or the vertical signal line 22 connected to the reference pixels 110 may result in poor image quality when readout is performed using the reference pixel section 12. Accordingly, configuring the reference pixel section 12 to include multiple reference pixel columns can reduce the influence of faults. Specifically, in the present embodiment, the vertical signal lines 22 corresponding to each of multiple reference pixel columns are joined to reduce the influence of defects in individual reference pixels 110 and vertical signal lines 22.

Figure 6:
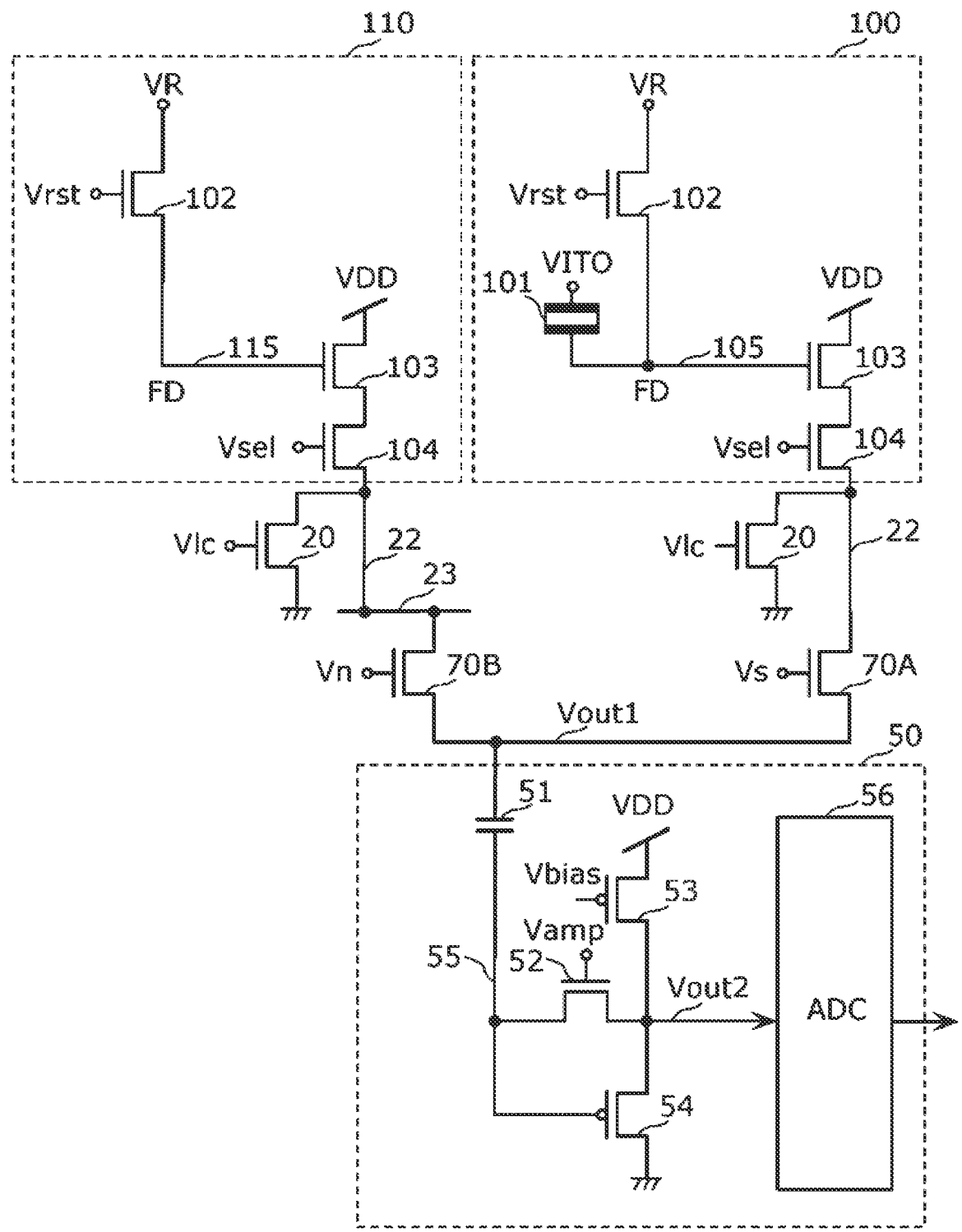
FIG. 6 is a diagram illustrating an example of the circuit configuration from pixels to a column signal processor according to Embodiment 1.
Figure 7:
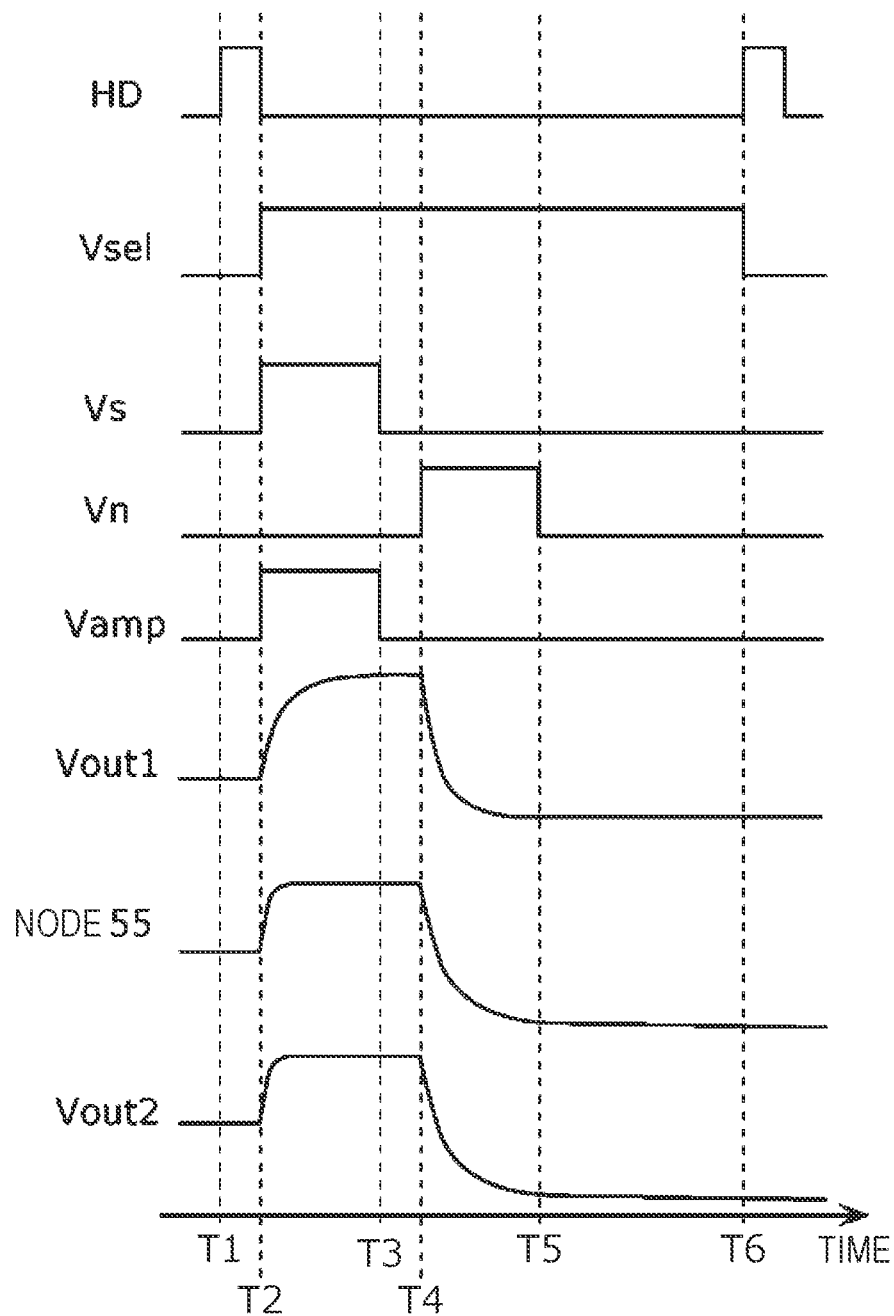
FIG. 7 is a timing chart for explaining an example of the processing of signals in the imaging device according to Embodiment 1.

Specific operations in regard to nondestructive readout using the reference pixel section 12 will be described using the circuit diagram illustrated in FIG. 6 and the timing chart illustrated in FIG. 7. FIG. 6 is a circuit diagram illustrating an example of the circuit configuration from pixels to the column signal processor 50. FIG. 7 is a timing chart for explaining an example of the processing of signals in the imaging device 200 according to Embodiment 1.

In FIG. 6, one imaging pixel 100 included in the imaging pixel section 11 and one reference pixel 110 included in the reference pixel section 12 in the same pixel row of the pixel array section 10 from among the multiple imaging pixels 100 and the multiple reference pixels 110 are illustrated as a pixel circuit. Accordingly, signal lines are connected to the imaging pixel 100 and the reference pixel 110 illustrated in FIG. 6 so that the same reset control signal Vrst and select control signal Vsel are supplied to the imaging pixel 100 and the reference pixel 110. Also, although not illustrated in FIG. 6, as described earlier, the vertical signal lines 22 provided in respective correspondence with the multiple reference pixel columns of the reference pixel section 12 are connected via the output signal line 23.

A current source transistor 20 is a transistor for the current source, and illustrates an exemplary configuration of the current source 21. The current source transistor 20 is in the conducting state during a readout operation.

The imaging pixel 100 is connected to the first switch section 70A, and the reference pixel 110 is connected to the second switch section 70B. Each of the first switch section 70A and the second switch section 70B is a transistor, for example. A control signal Vs is supplied to the gate of the first switch section 70A by a signal line from the controller 30. When the control signal Vs is high level, the first switch section 70A connects the output of the imaging pixel 100 to a node Vout1. Also, a control signal Vn is supplied to the gate of the second switch section 70B by a signal line from the controller 30. When the control signal Vn is high level, the second switch section 70B connects the output of the reference pixel 110 to the node Vout1.

The column signal processor 50 includes a capacitive element 51, a transistor 52, a transistor 53, a transistor 54, a node 55, a node Vout2, and an analog-to-digital converter (ADC) circuit 56.

The node Vout1 is connected to one end of the capacitive element 51. The other end of the capacitive element 51 is connected to the node 55. The signal amplitude of the node Vout1 is outputted as a signal to the node Vout2 via a circuit formed by the capacitive element 51, transistor 52, transistor 53, and transistor 54.

The transistor 52 is a control transistor for putting the potential of the node 55 into a reference state. A control signal Vamp is supplied to the gate of the transistor 52 by a signal line from the controller 30. One end of the transistor 52 is connected to the node 55. The other end of the transistor 52 is connected to the node Vout2.

The transistor 53 is a current source transistor. A power supply voltage VDD is supplied to the source of the transistor 53. The drain of the transistor 53 is connected to the node Vout2. The transistor 53 is in the conducting state during a readout operation.

The transistor 54 is the input transistor of a source follower circuit. The gate of the transistor 54 is connected to the node 55. The source of the transistor 54 is connected to the node Vout2. The drain of the transistor 54 is connected to ground. The transistor 54, together with the transistor 53, forms a source follower circuit.

The ADC circuit 56 performs AD conversion and outputs the voltage amplitude of the node Vout2 to a downstream circuit.

Next, operations by the imaging device 200 with the circuit configuration illustrated in FIG. 6 will be described using the timing chart in FIG. 7. FIG. 7 illustrates a timing chart of signals and the like involved in nondestructive readout. FIG. 7 illustrates, in order from the top, the voltage levels of a horizontal synchronization signal HD, the select control signal Vsel, the control signal Vs, the control signal Vn, the control signal Vamp, the node Vout1, the node 55, and the node Vout2. The horizontal synchronization signal HD is transmitted from the controller 30 to the vertical scanner 40 and indicates the timing of pixel row shift, for example.

First, after the horizontal synchronization signal HD goes high at time T1, access to the selected row, that is, the pixel row including the imaging pixel 100 and the reference pixel 110 illustrated in FIG. 6, is started.

Next, at time T2, the select control signal Vsel is set to high level to turn on the select transistor 104 of each of the imaging pixel 100 and the reference pixel 110 in the same pixel row. At the same time, the control signal Vs and the control signal Vamp are set to high level to turn on the first switch section 70A and the transistor 52. This causes the signal of the imaging pixel 100 to be outputted to the node Vout1. At this time, signal charge corresponding to incident light is being stored in the charge storage 105 of the imaging pixel 100. Accordingly, the imaging pixel 100 outputs a pixel signal corresponding to the incidence of light. Also, the voltage of the node 55 goes to a predetermined initial voltage. The voltage of the node Vout1 changes from the voltage state at time T1 and converges on a voltage corresponding to the level of the pixel signal of the imaging pixel 100. Also, the voltage of the node Vout2 changes from the voltage state at time T1 and converges on an equilibrium-state voltage when the transistor 52 is turned on. Note that in the present embodiment, since the signal charge is a quantity of holes, the voltage of the node Vout1 rises according to the signal charge quantity, but in the case where the signal charge is a quantity of electrons, the voltage falls according to the signal charge quantity.

Next, at time T3, the control signal Vs and the control signal Vamp are set to low level to turn off the first switch section 70A and the transistor 52. This puts the node 55 into a floating state.

Thereafter, at time T4, the control signal Vn is set to high level to turn on the second switch section 70B. This causes the signal of the reference pixel 110 to be outputted to the node Vout1. Signal charge corresponding to the incidence of light is not stored in the charge storage 115 of the reference pixel 110. Accordingly, the reference pixel 110 outputs a reset signal corresponding to the output signal at reset of the imaging pixel 100. Also, since the select transistors 104 of at least two reference pixels 110 in the same pixel row are in the on state, a reference signal which is the signal obtained by averaging the reset signals outputted by each of the at least two reference pixels 110 is outputted to the node Vout1. In other words, the reset signals outputted by the at least two reference pixels 110 are combined and outputted to the column signal processor 50. The voltage of the node Vout1 changes from a voltage corresponding to the level of the pixel signal of the imaging pixel 100 and converges on a voltage corresponding to the level of the reference signal. In response, the voltage of the node 55 in the floating state changes via the capacitive element 51, and the resistance of the transistor 54, of which the gate is connected to the node 55, changes, whereby the voltage of the node Vout2 changes. The operations thus far cause a voltage corresponding to the output voltage difference between the imaging pixel 100 and the reference pixels 110 to be outputted to the node 55 and the node Vout2.

Next, at time T5, the control signal Vn is set to low level to turn off the second switch section 70B, which causes the voltages of the node 55 and the node Vout2 to be retained, and an AD conversion process is performed by the downstream ADC circuit 56. In this way, the column signal processor 50 outputs the difference between the pixel signal outputted by an imaging pixel 100 and a reference signal based on the reset signals outputted by at least two reference pixels 110 located in the same row as the imaging pixel 100.

Thereafter, at time T6, the next pulse of the horizontal synchronization signal HD is issued, and the selected row shifts to the next row.

As above, in nondestructive readout in the present embodiment, a voltage corresponding to the output signals of reference pixels 110 in the same row as the imaging pixels 100 is used as the reference voltage of the signal level (in other words, a reference signal). This can reduce the influence of the difference in the pixel position in the column direction and allow the reference voltage to simulate the voltage after the reset operation of the imaging pixel 100 in the row in question, thereby reducing the decrease in signal amplitude and the addition of an unwanted offset component. In addition, since multiple reference pixel columns are provided, a reference signal is generated on the basis of the reset signals outputted by at least two reference pixels 110. This can reduce the influence of faults in the reference pixels 110 and/or the vertical signal lines 22. Specifically, in the present embodiment, the vertical signal lines 22 corresponding to each of multiple reference pixel columns are joined and the outputs of at least two reference pixels 110 are averaged, whereby the influence of defects in individual reference pixels 110 and vertical signal lines 22 can be reduced.

Embodiment 2

The following describes an imaging device according to Embodiment 2. In the following description of Embodiment 2, the differences from Embodiment 1 will be described primarily, while description of the commonalities will be omitted or simplified.

Figure 8:
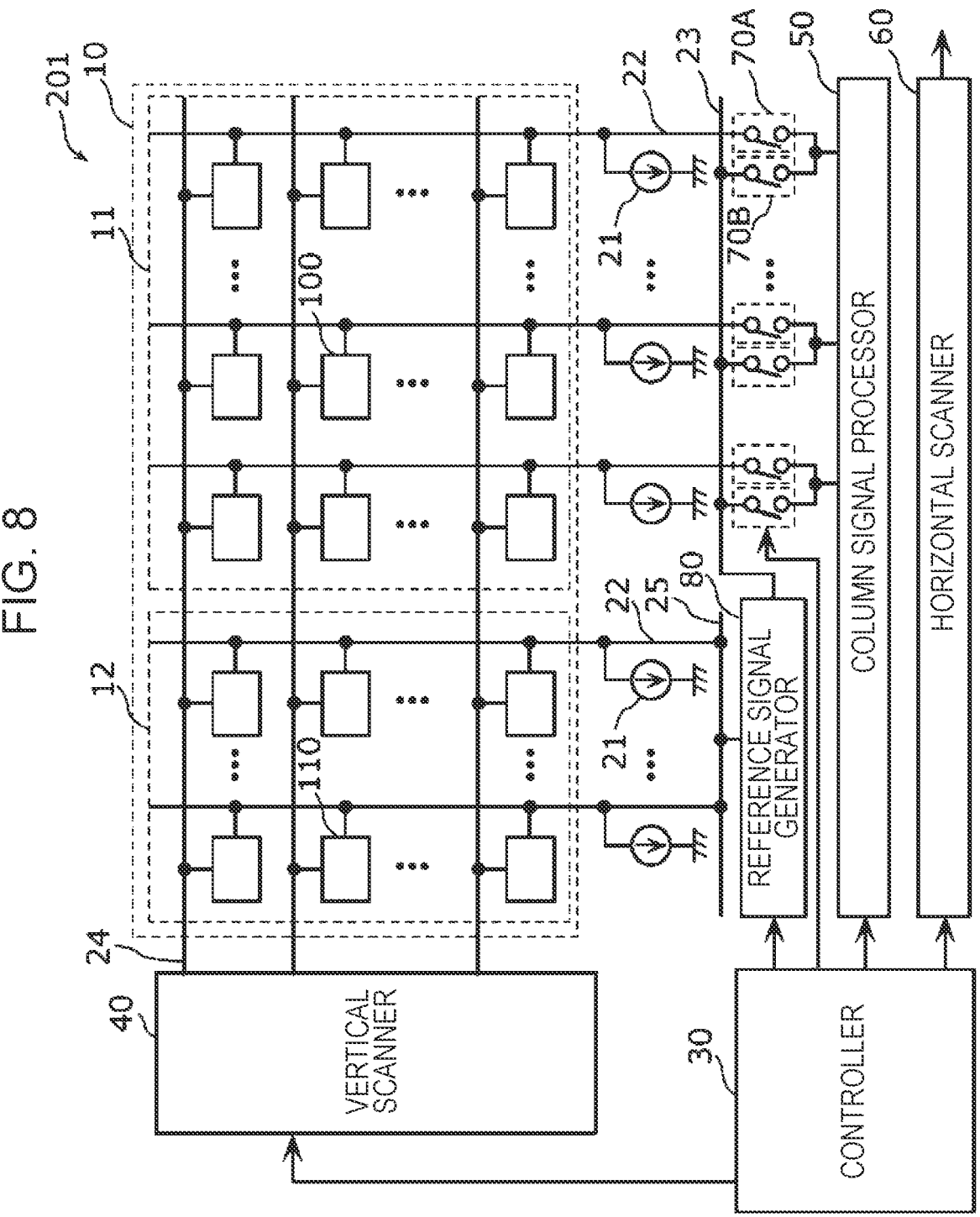
FIG. 8 is a block diagram illustrating an overall configuration of an imaging device according to Embodiment 2.

FIG. 8 is a block diagram illustrating an overall configuration of an imaging device 201 according to Embodiment 2. As illustrated in FIG. 8, the imaging device 201 according to the present embodiment differs from the imaging device 200 according to Embodiment 1 by being further provided with a reference signal generator 80 downstream of the multiple reference pixels 110 and upstream of the column signal processor 50.

The reference signal generator 80 is connected to a vertical signal line 25 and is also connected, via the output signal line 23, to the second switch section 70B corresponding to each pixel column in the imaging pixel section 11.

The vertical signal line 25 connects the vertical signal lines 22 disposed in correspondence with each of the reference pixel columns in the reference pixel section 12 to each other. The reference pixels 110 are connected to the reference signal generator 80 via the vertical signal lines 22 and the vertical signal line 25. With this arrangement, the reset signals of at least two reference pixels 110 in the same row are combined and averaged in a manner similar to Embodiment 1.

The reference signal generator 80 is a buffer circuit or an offset circuit, for example. The signals outputted by the reference pixels 110 are outputted to the column signal processor 50 via the reference signal generator 80. An example of the circuit configuration of the reference signal generator 80 is indicated below, but the circuit configuration of the reference signal generator 80 is not limited to the example below.

Figure 9:
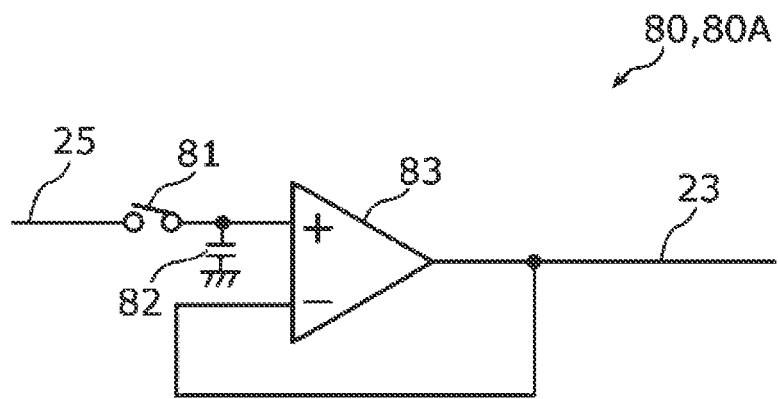
FIG. 9 is a diagram illustrating a first example of the circuit configuration of a reference signal generator according to Embodiment 2.

First, a case in which the reference signal generator 80 is a buffer circuit 80A will be described as a first example of the circuit configuration of the reference signal generator 80. FIG. 9 is a diagram illustrating the first example of the circuit configuration of a reference signal generator according to the present embodiment.

As illustrated in FIG. 9, the buffer circuit 80A may be a unity gain buffer configuration that feeds back the output of an amplifier 83 to an inverting input terminal, for example. The buffer circuit 80A includes a switch 81, a capacitive element 82, and an amplifier 83.

The switch 81 is connected to the vertical signal line 25 and toggles the input and cutoff of signals from the vertical signal line 25 to the amplifier 83.

One end of the capacitive element 82 is connected to the switch 81 and a non-inverting input terminal of the amplifier 83. The other end of the capacitive element 82 is connected to ground. Providing the switch 81 and the capacitive element 82 in the input path of a signal from the reference pixels 110 to the non-inverting input terminal of the amplifier 83 makes it possible to sample and hold the inputted signal.

The amplifier 83 is an operational amplifier, for example. The non-inverting input terminal of the amplifier 83 is connected to the vertical signal line 25 to which the signal from the reference pixel section 12 is outputted via the switch 81. The output of the amplifier 83 is fed back to the inverting input terminal of the amplifier 83. The output of the amplifier 83 is also connected to the output signal line 23.

Such a buffer circuit 80A allows the input signal, that is, the signal outputted by the reference pixels 110 in the reference pixel section 12, to be outputted with low impedance. The buffer circuit 80A also makes is possible to raise the drive capability (that is, the output current) of the reference signal to be outputted to the output signal line 23. Accordingly, convergence of the voltage at the output destination of the buffer circuit 80A can be sped up.

Figure 10:
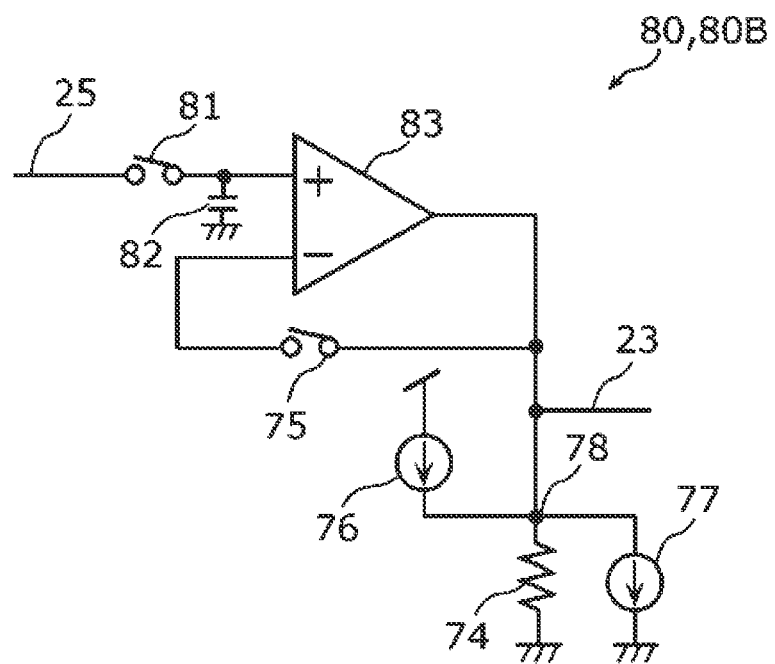
FIG. 10 is a diagram illustrating a second example of the circuit configuration of the reference signal generator according to Embodiment 2.

Next, a case in which the reference signal generator 80 is an offset circuit 80B will be described as a second example of the circuit configuration of the reference signal generator 80. FIG. 10 is a diagram illustrating the second example of the circuit configuration of a reference signal generator according to the present embodiment. The offset circuit 80B outputs a signal obtained by adding a positive or negative voltage to an inputted signal to the column signal processor 50 as a reference signal.

As illustrated in FIG. 10, the offset circuit 80B differs from the buffer circuit 80A by being further provided with a resistor 74, a switch 75, a current source 76, a current source 77, and a node 78.

In the offset circuit 80B, the output of the amplifier 83 is connected to ground via the node 78 and the resistor 74, and is also connected to an inverting input terminal of the amplifier via the switch 75. The output of the amplifier 83 is also connected to the output signal line 23.

One end of the resistor 74 is connected to ground. The other end of the resistor 74 is connected to the current sources 76 and 77 via the node 78.

The switch 75 toggles the input and cutoff of feedback from the output of the amplifier 83 to the inverting input terminal of the amplifier 83.

The current source 76 draws current into the node 78 to which the resistor 74 is connected. The current source 77 draws current from the node 78 to which the resistor 74 is connected. The current source 76 and the current source 77 are controlled to not operate at the same time.

Next, operations by the offset circuit 80B will be described. The operations by the offset circuit 80B is controlled by the controller 30, for example.

First, by turning on the switch 75, a voltage which is the same as the inputted signal, namely the voltage on the vertical signal line 25, is outputted to the output signal line 23. At this time, the current source 76 and the current source 77 are put into the non-operating state.

Thereafter, the switch 75 is turned off. At this time, if the current source 76 is put into the operating state, a current is drawn into the node 78 by the current source 76 and new current flows through the resistor 74, which causes the voltage on the output signal line 23 to go higher than before the operation of the current source 76. Also, at this time, if the current source 77 is put into the operating state, a current is drawn from the node 78 by the current source 77 and the current flowing through the resistor 74 decreases, which causes the voltage on the output signal line 23 to go lower than before the operation of the current source 77. Also, at this time, if the current source 76 and the current source 77 are left in the non-operating state, the voltage on the output signal line 23 does not change. By appropriately setting the amount of current to draw in each of the current source 76 and the current source 77, the amount of change in the voltage can be set freely.

In this way, by adjusting whether to put the current source 76 and the current source 77 into the operating state and the amounts of current to draw in the current source 76 and the current source 77, the offset circuit 80B can add a positive or negative offset voltage of freely chosen magnitude to the inputted signal, and output the resulting voltage to the downstream output signal line 23. Therefore, this enables fine adjustment of the reference signal by adding such an offset voltage, even when the voltages of the reference pixels 110 have a deviation from the voltage of the imaging pixel 100 after the reset operation.

Operations by the imaging device 201 are similar to those of the imaging device 200 described above, except that the output from the reference pixel 110 is outputted to the column signal processor 50 via the reference signal generator 80.

Embodiment 3

The following describes an imaging device according to Embodiment 3. In the following description of Embodiment 3, the differences from Embodiments 1 and 2 will be described primarily, while description of the commonalities will be omitted or simplified.

Figure 11:
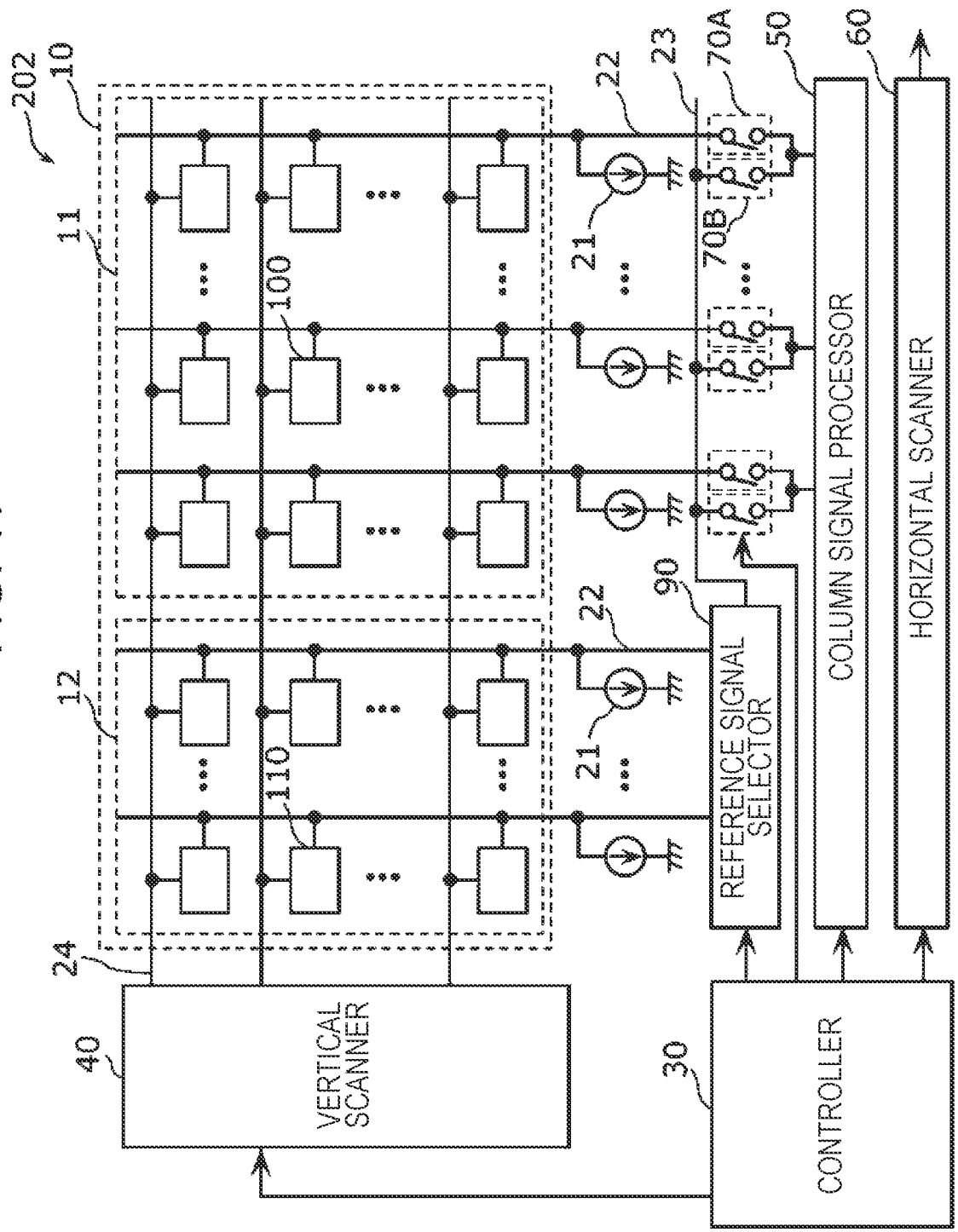
FIG. 11 is a block diagram illustrating an overall configuration of an imaging device according to Embodiment 3.

FIG. 11 is a block diagram illustrating an overall configuration of an imaging device 202 according to Embodiment 3. As illustrated in FIG. 11, the imaging device 202 according to the present embodiment differs from the imaging device 200 according to Embodiment 1 by being further provided with a reference signal selector 90 electrically connected to the reference pixels 110.

The reference signal selector 90 is connected to the vertical signal lines 22 and the second switch sections 70B corresponding to each of the reference pixel columns in the reference pixel section 12. The reference signal selector 90 selects at least one of the reset signals outputted respectively to the vertical signal lines 22 corresponding to each of the reference pixel columns in the reference pixel section 12, and outputs the selected reset signal(s) to the column signal processor 50 as a reference signal. The reference signal selector 90 is an example of a selector circuit. When two or more reset signals are selected, the two or more reset signals are combined.

Figure 12:
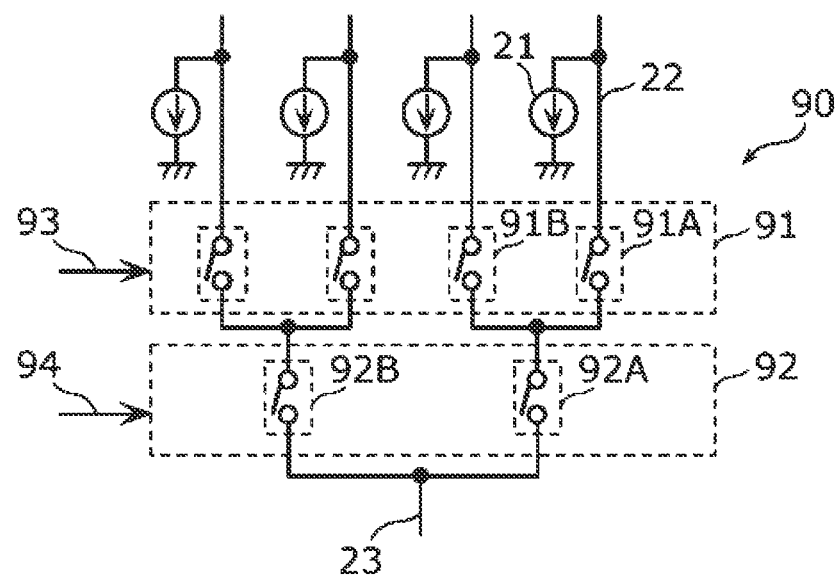
FIG. 12 is a diagram illustrating an example of the circuit configuration of a reference signal selector according to Embodiment 3.

FIG. 12 is a diagram illustrating an example of the circuit configuration of the reference signal selector 90. FIG. 12 illustrates an example of the case where there are four reference pixel columns, but the number of reference pixel columns is not limited to four columns. The reference signal selector 90 may be configured as at least one switch group, for example. In the example illustrated in FIG. 12, the reference signal selector 90 includes a switch group 91 and a switch group 92.

The switches included in the switch group 91 are arranged in respective correspondence with the reference pixel columns, for example. The switch group 91 includes multiple switch pairs formed from a switch 91A that toggles the input and cutoff of a signal from one of adjacent vertical signal lines 22 and a switch 91B that toggles the input and cutoff of a signal from the other. The output sides of the switch 91A and the switch 91B are joined and connected to one of the switches in the switch group 92. Operations by the switch group 91 are controlled by a control signal 93.

The switch group 92 includes a switch 92A that toggles the input and cutoff of a signal from one of adjacent switch pairs in the switch group 91 and a switch 92B that toggles the input and cutoff of a signal from the other. The output sides of the switch 92A and the switch 92B are joined and connected to the output signal line 23. Operations by the switch group 92 are controlled by a control signal 94.

In this example, the control signal 93 is used to select which of the switch 91A and the switch 91B in each switch pair is to be conducting, and the control signal 94 is used to select which of the switch 92A and the switch 92B is to be conducting, for instance. For example, if the control signal 93 is high level, the switch 91A is conducting, and if the control signal 93 is low level, the switch 91B is conducting. Similarly, if the control signal 94 is high level, the switch 92A is conducting, and if the control signal 94 is low level, the switch 92B is conducting. The control signal 93 and the control signal 94 are inputted from the controller 30, for example. By suitably setting the high level and low level of the control signal 93 and the control signal 94, the reset signals to be outputted from the reference pixels 110 in freely chosen reference pixel columns can be selected.

In this way, by providing the imaging device 202 with the reference signal selector 90, even if there are defects in the reference pixels 110 and/or the vertical signal line 22 of a specific column in the reference pixel section 12, the influence of faults can be avoided by selecting reset signals outputted from the reference pixels 110 in a different column as the reference signal.

Note that the present embodiment and Embodiment 2 may also be combined so that the imaging device 202 is further provided with the reference signal generator 80. In this case, the output of the reference signal selector 90 is inputted into the reference signal generator 80. This arrangement makes it possible to avoid the influence of faults in the reference pixels 110, and in addition, output a reference voltage with low impedance and increase the drive capability of the output signal to the output signal line 23.

In the example above, the reset signal outputted to one vertical signal line 22 is selected, but the configuration is not limited thereto. For example, the reference signal selector 90 may select the reset signals outputted to multiple vertical signal lines 22, and the selected reset signals may be combined and outputted as the reference signal.

Also, there may be one switch group included in the reference signal selector 90, and the one switch group may include switches arranged in respective correspondence with the reference pixel columns, as in the switch group 91. The switches are each controlled to be conducting or non-conducting by a control signal, for example.

Embodiment 4

The following describes an imaging device according to Embodiment 4. In the following description of Embodiment 4, the differences from Embodiments 1 to 3 will be described primarily, while description of the commonalities will be omitted or simplified.

Figure 13:
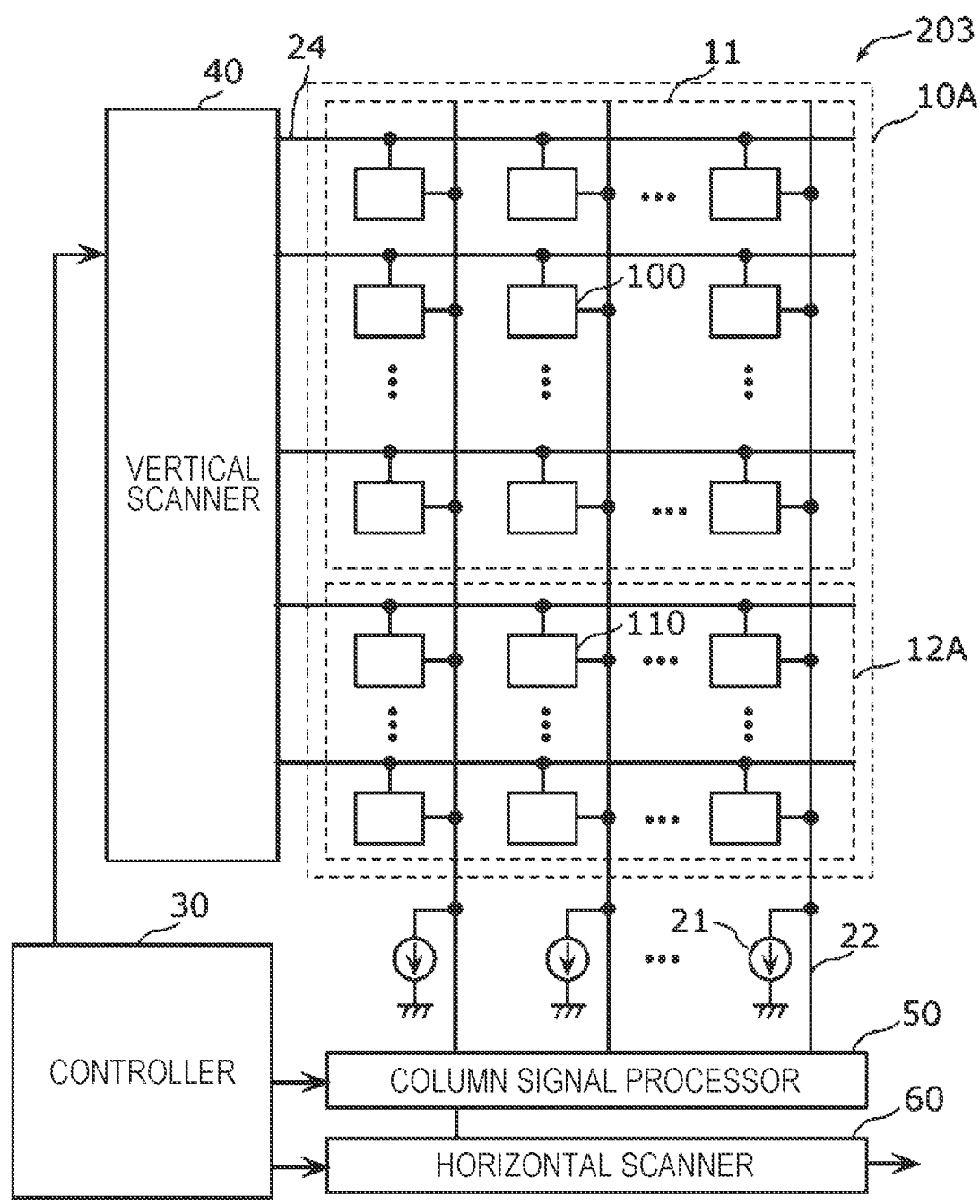
FIG. 13 is a block diagram illustrating an overall configuration of an imaging device according to Embodiment 4.

FIG. 13 is a block diagram illustrating an overall configuration of an imaging device 203 according to Embodiment 4. As illustrated in FIG. 13, the imaging device 203 according to the present embodiment differs from the imaging device 200 according to Embodiment 1 by being provided with a pixel array section 10A that includes the imaging pixel section 11 and a reference pixel section 12A, instead of the pixel array section 10 that includes the imaging pixel section 11 and the reference pixel section 12.

The reference pixel section 12A is a pixel section in which multiple reference pixels 110 are arranged in a matrix of rows and columns. The reference pixel section 12A is disposed at an end of the pixel array section 10A in the column direction, for example. The reference pixel section 12A is located on the column-direction side of the imaging pixel section 11. In other words, in the pixel array section 10A, the imaging pixel section 11 and the reference pixel section 12A are arranged along the column direction. In the pixel array section 10A, the multiple reference pixels 110 are disposed in different rows than the multiple imaging pixels 100, and are aligned in the row direction in at least two rows. Hereinafter, a pixel row containing multiple reference pixels 110 aligned in the row direction in the reference pixel section 12A may be referred to as a "reference pixel row". In other words, the reference pixel section 12A includes multiple reference pixel rows. The number of imaging pixels 100 arranged in the row direction in the imaging pixel section 11 and the number of reference pixels 110 arranged in the row direction in the reference pixel section 12A are the same.

Also, in the imaging device 203, the reference pixels 110 in the reference pixel section 12A and the imaging pixels 100 of the imaging pixel section 11 arranged in the same column are connected to the same vertical signal line 22. Also, the reference pixels 110 and the imaging pixels 100 arranged in the same column are connected to the same current source 21 via the same vertical signal line 22. This allows for a reduction in power consumption. Also, each vertical signal line 22 is connected to the column signal processor 50.

The scanning line 24 is connected to each of the imaging pixels 100 or reference pixels 110 in the same pixel row of the pixel array section 10A. During a readout operation, one of the multiple reference pixel rows in the reference pixel section 12A is selected by a select control signal from the vertical scanner 40, for example. Accordingly, at least one of the reset signals outputted by at least two reference pixels 110 connected to the same vertical signal line 22 is outputted to the column signal processor 50 as a reference signal. With this arrangement, even if there are defects in the reference pixels 110 and/or the scanning line 24 of a specific row in the reference pixel section 12A, the influence of faults can be avoided by selecting reset signals outputted from the reference pixels 110 in a different row as the reference signal. In the present embodiment, the circuit formed by the vertical scanner 40 and the select transistors 104 of the reference pixels 110 is an example of a selector circuit.

Figure 14:
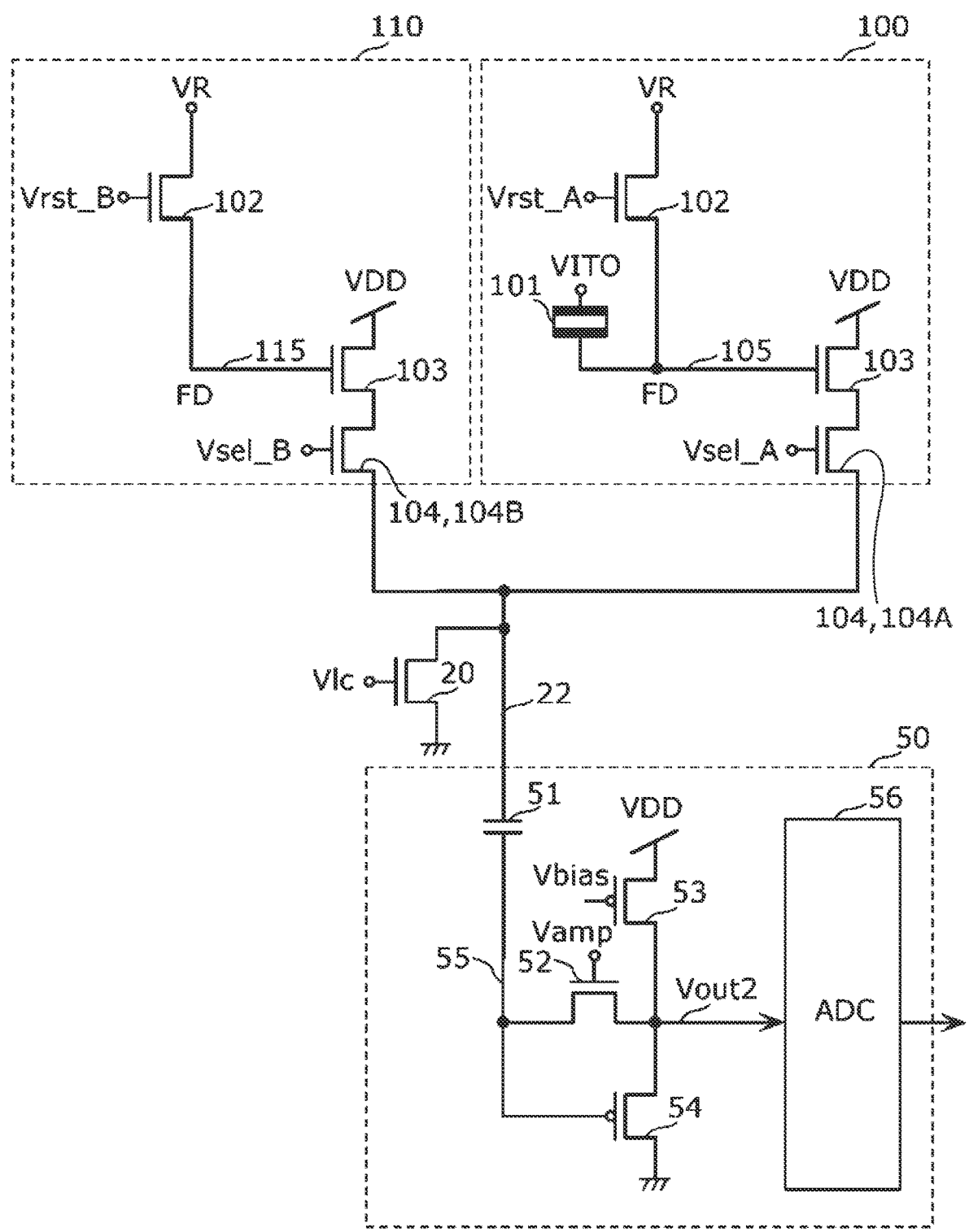
FIG. 14 is a diagram illustrating an example of the circuit configuration from pixels to a column signal processor according to Embodiment 4.
Figure 15:
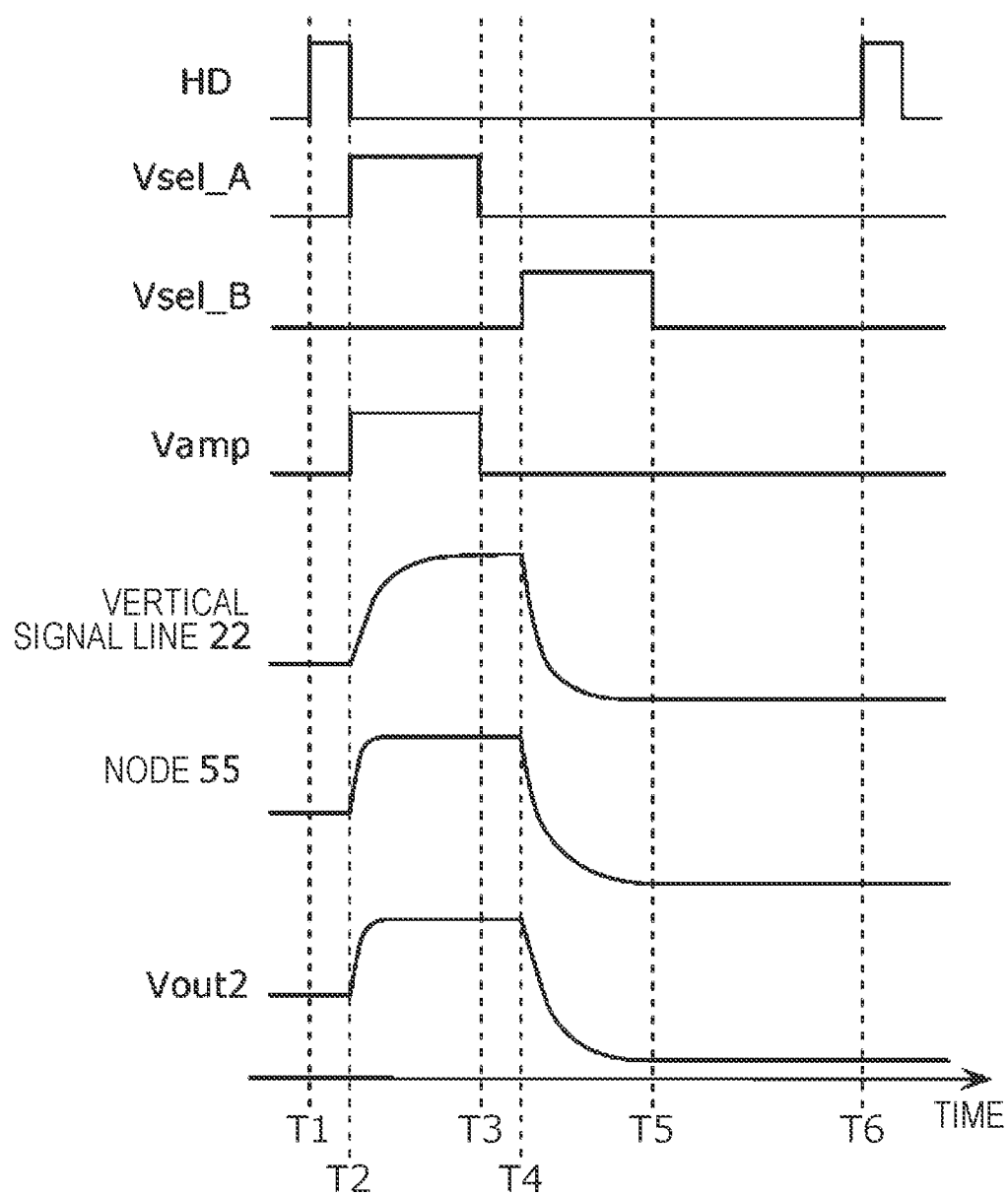
FIG. 15 is a timing chart for explaining an example of the processing of signals in the imaging device according to Embodiment 4.

Specific operations in regard to nondestructive readout using the reference pixel section 12A will be described using the circuit diagram illustrated in FIG. 14 and the timing chart illustrated in FIG. 15. FIG. 14 is a diagram illustrating an example of the circuit configuration from pixels to the column signal processor 50 according to Embodiment 4. FIG. 15 is a timing chart for explaining an example of the processing of signals in the imaging device 203 according to Embodiment 4.

In FIG. 14, one imaging pixel 100 included in the imaging pixel section 11 and one reference pixel 110 included in the reference pixel section 12A in the same pixel column of the pixel array section 10A from among the multiple imaging pixels 100 and the multiple reference pixels 110 are illustrated as a pixel circuit.

The reference pixel section 12A includes multiple reference pixel rows, of which one row is selected at the time of use, for example. Which row is selected is determined by prior failure testing, for example. Similarly to FIG. 6, the current source transistor 20 is a transistor for the current source, and illustrates a specific configuration of the current source 21. The current source transistor 20 is connected to the both the imaging pixel 100 and the reference pixel 110, but is electrically connected to only one at a time by controlling the turning on and off of each of the imaging pixel 100 and reference pixel 110. Hereinafter, for the sake of distinction, the select transistor 104 of the imaging pixel 100 may be referred to as the select transistor 104A, and the select transistor 104 of the reference pixel 110 may be referred to as the select transistor 104B.

The turning on and off of the select transistor 104A is controlled by a select control signal Vsel_A supplied to a select control signal line included in the scanning line 24. The turning on and off of the select transistor 104B is controlled by a select control signal Vsel_B supplied to a select control signal line included in the scanning line 24. The vertical signal line 22 is connected to one end of the capacitive element 51. The rest of the configuration is the same as the configuration in FIG. 6 described above.

Next, specific operations by the imaging device 203 according to the present embodiment will be described using the timing chart illustrated in FIG. 15. FIG. 15 illustrates a timing chart of signals and the like involved in nondestructive readout. In the timing chart illustrated in FIG. 15, with respect to the items on the timing chart in FIG. 7, the voltage levels of the select control signal Vsel_A, the select control signal Vsel_B, and the vertical signal line 22 are illustrated instead of the control signal Vs, the control signal Vn, the select control signal Vsel, and the node Vout1. The types and operations of other control signals and nodes in FIG. 15 are the same as in the timing chart in FIG. 7, and in the following description, descriptions of duplicate operations will be omitted or simplified.

As described above, the select control signal Vsel_A is a control signal that controls the select transistor 104A of the imaging pixel 100. The select control signal Vsel_B is a control signal that controls the select transistor 104B of the reference pixel 110. In the present embodiment, the same vertical signal line 22 is shared by the imaging pixel 100 and the reference pixel 110 in the same column. Accordingly, which of the imaging pixel 100 and the reference pixel 110 is to be connected to the vertical signal line 22 is controlled in a time-division manner by the select control signal Vsel_A and the select control signal Vsel_B.

Also, as the reset control signal Vrst, a reset control signal Vrst_A and a reset control signal Vrst_B corresponding to the reset transistor 102 of the imaging pixel 100 and the reference pixel 110, respectively, are supplied at the same timing.

Operations by the imaging device 203 with the circuit configuration illustrated in FIG. 14 will be described using the timing chart in FIG. 15.

First, after the horizontal synchronization signal HD goes high at time T1, access to the selected row, that is, the pixel row including the imaging pixel 100 illustrated in FIG. 14, is started.

Next, at time T2, the select control signal Vsel_A is set to high level to turn on the select transistor 104A. At the same time, the control signal Vamp is set to high level to turn on the transistor 52. This causes the pixel signal of the imaging pixel 100 to be outputted to the vertical signal line 22. Also, the voltage of the node 55 goes to a predetermined initial voltage. The voltage on the vertical signal line 22 changes from the voltage state at time T1 and converges on a voltage corresponding to the level of the pixel signal of the imaging pixel 100. Also, the voltage of the node Vout2 changes from the voltage state at time T1 and converges on an equilibrium-state voltage when the transistor 52 is turned on.

Next, at time T3, the select control signal Vsel_A and the control signal Vamp are set to low level to turn off the select transistor 104A and the transistor 52.

Thereafter, at time T4, the select control signal Vsel_B is set to high level to turn on the select transistor 104B. This causes the reset signal of the reference pixel 110 to be outputted to the vertical signal line 22 as a reference signal. The voltage on the vertical signal line 22 changes from a voltage corresponding to the level of the pixel signal of the imaging pixel 100 and converges on a voltage corresponding to the level of the reference signal. In response, the voltage of the node 55 changes via the capacitive element 51, and voltage of the node Vout2 changes. The operations thus far cause a voltage corresponding to the output voltage difference between the imaging pixel 100 and the reference pixels 110 to be outputted to the node 55 and the node Vout2.

Next, at time T5, the select control signal Vsel_B is set to low level to turn off the select transistor 104B, which causes the voltages of the node 55 and the node Vout2 to be retained, and an AD conversion process is performed by the downstream ADC circuit 56. In this way, the column signal processor 50 outputs the difference between the pixel signal outputted by an imaging pixel 100 and a reference signal which is a signal selected from the reset signals outputted by at least two reference pixels 110 located in the same column as the imaging pixel 100.

Thereafter, at time T6, the next pulse of the horizontal synchronization signal HD is issued, and the selected row shifts to the next row.

As above, in nondestructive readout in the present embodiment, a voltage corresponding to the output signals of reference pixels 110 in the same column as the imaging pixel 100 is used as the reference voltage of the signal level (in other words, a reference signal). This can reduce the influence of the difference in the pixel position in the row direction and allow the reference voltage to simulate the voltage after the reset operation of the imaging pixel 100 in the column in question, thereby reducing the decrease in signal amplitude and the addition of an unwanted offset component. In addition, since multiple reference pixel rows are provided, a reference signal is generated on the basis of the reset signals outputted by at least two reference pixels 110. This reduces the influence of faults in the reference pixels 110.

Note that in the example above, the reset signal outputted by one of at least two reference pixels 110 located in the same column as the imaging pixel 100 is selected as the reference signal, but the configuration is not limited thereto. By having the vertical scanner 40 supply the same select control signal Vsel_B to two or more reference pixels 110 in different rows, the reset signals outputted by the two or more reference pixels 110 may be combined and outputted to the vertical signal line 22 as the reference signal. This can reduce the influence of defects in individual reference pixels 110.

Embodiment 5

The following describes an imaging device according to Embodiment 5. In the following description of Embodiment 5, the differences from Embodiments 1 to 4 will be described primarily, while description of the commonalities will be omitted or simplified.

Figure 16:
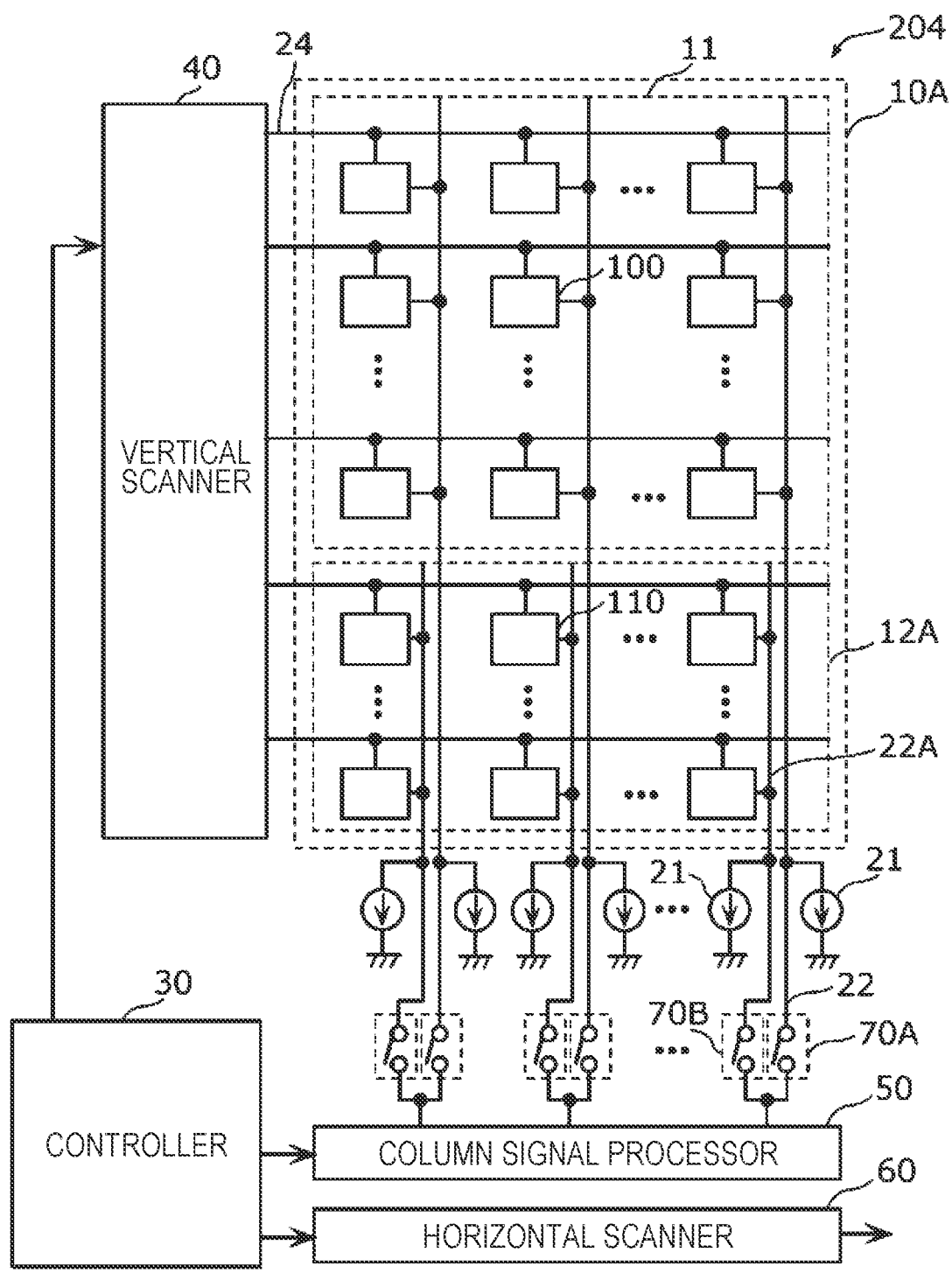
FIG. 16 is a block diagram illustrating an overall configuration of an imaging device according to Embodiment 5.

FIG. 16 is a block diagram illustrating an overall configuration of an imaging device 204 according to Embodiment 5. As illustrated in FIG. 16, the imaging device 204 according to the present embodiment differs from the imaging device 203 according to Embodiment 4 in that the reference pixels 110 in the reference pixel section 12A are connected to a vertical signal line 22A different from the vertical signal line 22 connected to the imaging pixels 100 in the imaging pixel section 11, and by being further provided with the first switch section 70A and the second switch section 70B.

The vertical signal line 22 is connected only to the imaging pixels 100 among the pixels arranged in the same column in the pixel array section 10A. Also, the vertical signal line 22 is connected to a current source 21 and the first switch section 70A.

The vertical signal line 22A is connected only to the reference pixels 110 among the pixels arranged in the same column in the pixel array section 10A. Also, the vertical signal line 22A is connected to a current source 21 and the second switch section 70B.

The vertical signal line 22 and the vertical signal line 22A are each provided in correspondence with each pixel column in the pixel array section 10A. In the imaging device 204, two current sources 21 are disposed with respect to one pixel column in the pixel array section 10A.

In the imaging device 204 according to the present embodiment, for example, the select control signal Vsel_A and the select control signal Vsel_B are supplied to the select transistor 104A and the select transistor 104B at the same timing as the select control signal Vsel illustrated in FIG. 7. The timings at which output signals from the imaging pixels 100 and output signals from the reference pixels 110 are inputted into the column signal processor 50 are controlled by the first switch section 70A and the second switch section 70B, in a manner similar to Embodiment 1. The specific operations by the imaging device 204 according to the present embodiment are the same as in the timing chart illustrated in FIG. 7, for example.

In the present embodiment, since the imaging pixel 100 and the reference pixel 110 are connected to different vertical signal lines, the select transistor 104 of the imaging pixel 100 can be turned on at the same time as the select transistor 104 of the reference pixel 110. Therefore, the imaging device 204 does not need to wait for the time from when the select transistor 104A of the reference pixel 110 is turned on until the vertical signal line 22A converges, enabling a speedup in nondestructive readout with respect to the imaging device 203 according to Embodiment 4.

Embodiment 6

The following describes an imaging device according to Embodiment 6. In the following description of Embodiment 6, the differences from Embodiments 1 to 5 will be described primarily, while description of the commonalities will be omitted or simplified.

Figure 17:
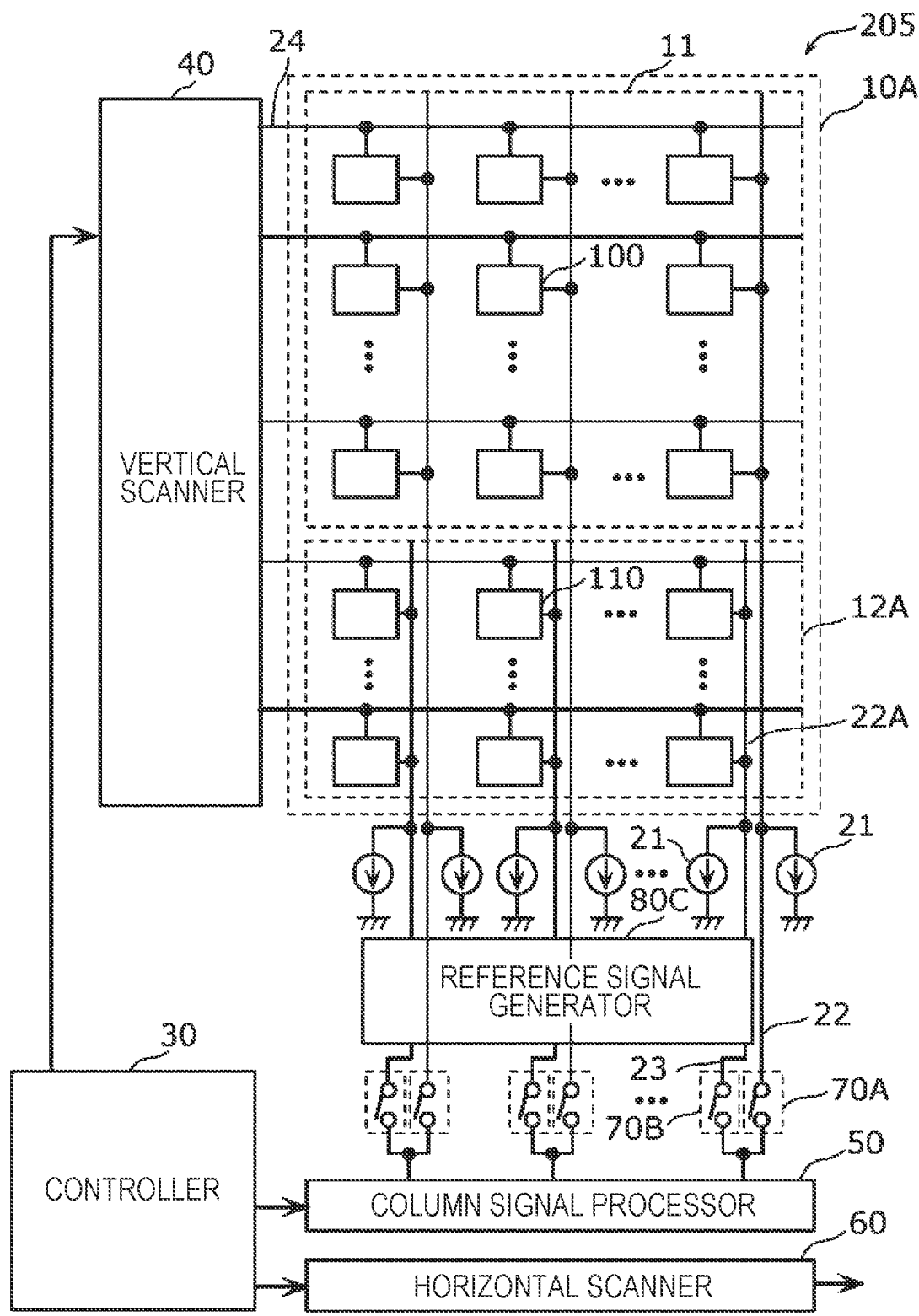
FIG. 17 is a block diagram illustrating an overall configuration of an imaging device according to Embodiment 6.

FIG. 17 is a block diagram illustrating an overall configuration structure of an imaging device 205 according to Embodiment 6. As illustrated in FIG. 17, the imaging device 205 according to the present embodiment differs from the imaging device 204 according to Embodiment 5 by being further provided with a reference signal generator 80C.

The reference signal generator 80C is connected to the vertical signal line 22A connected to the reference pixels 110 in the reference pixel section 12A. The reference signal generator 80C is also connected to the second switch section 70B via the output signal line 23.

The configuration of the reference signal generator 80C is similar to the configuration of the buffer circuit 80A illustrated in FIG. 9 or the offset circuit 80B illustrated in FIG. 10. In the reference signal generator 80C, the vertical signal line 22A is connected to the switch 81 instead of the vertical signal line 25 illustrated in FIGS. 9 and 10. The reference signal generator 80C includes multiple buffer circuits 80A or multiple offset circuits 80B, for example. The buffer circuits 80A or offset circuits 80B are disposed in correspondence with vertical signal lines 25. In other words, one buffer circuit 80A or offset circuit 80B is connected to each vertical signal line 25. Since the operations by the reference signal generator 80C are similar to the operations described in Embodiment 2, a description is omitted.

Also, operations by the imaging device 205 are similar to those of the imaging device 204 described above, except that the output from the reference pixel 110 is outputted to the column signal processor 50 via the reference signal generator 80C.

Embodiment 7

The following describes an imaging device according to Embodiment 7. In the following description of Embodiment 7, the differences from Embodiments 1 to 6 will be described primarily, while description of the commonalities will be omitted or simplified.

Figure 18:
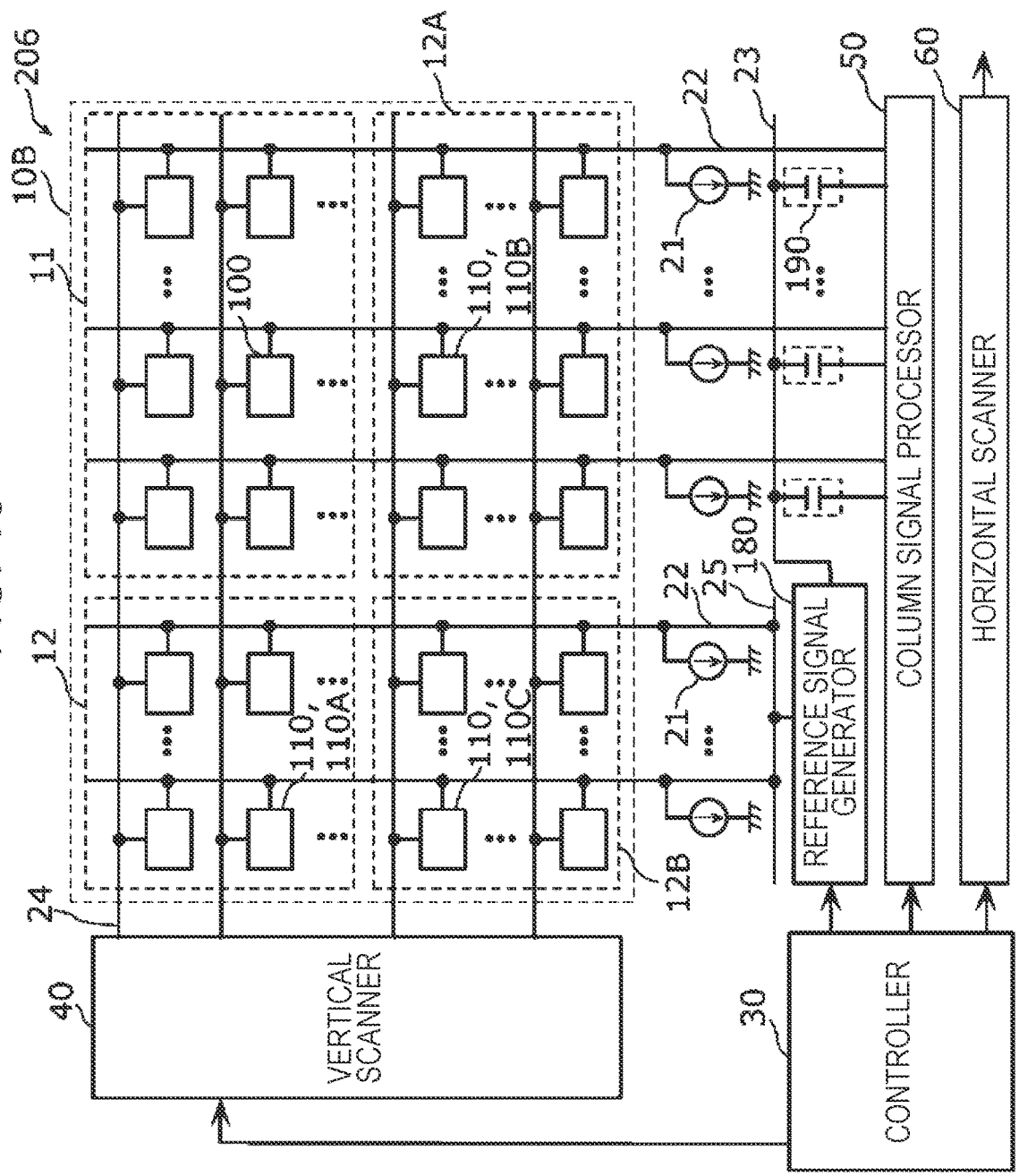
FIG. 18 is a block diagram illustrating an overall configuration of an imaging device according to Embodiment 7.

FIG. 18 is a block diagram illustrating an overall configuration of an imaging device 206 according to Embodiment 7. As illustrated in FIG. 18, the imaging device 206 according to the present embodiment differs from the imaging device 200 according to Embodiment 1 by being provided with a pixel array section 10B that includes the imaging pixel section 11, the reference pixel section 12, a reference pixel section 12A, and a reference pixel section 12B instead of the pixel array section 10 that includes the imaging pixel section 11 and the reference pixel section 12. Also, the imaging device 206 according to the present embodiment differs from the imaging device 200 according to Embodiment 1 by being further provided with a reference signal generator 180 and a capacitive element 190. The imaging device 206 according to the present embodiment is configured to suppress the influence of both a difference in voltage after a reset operation due to the difference in the pixel position in the vertical direction and a difference in voltage after a reset operation due to the difference in the pixel position in the horizontal direction.

Specifically, a difference in voltage after a reset operation due to the difference in the pixel position in the vertical direction is obtained by detecting the difference between the output signal of the reference pixel section 12 located in the horizontal direction of the imaging pixel section 11 and the output signal of the reference pixel section 12B located in the diagonal direction of the imaging pixel section 11. By adding this difference to the output signal of the reference pixel section 12A located in the vertical direction of the imaging pixel section 11, it is possible to suppress the influence of a difference in voltage after a reset operation due to the differences in the pixel position in both the vertical and horizontal directions.

The reference pixel section 12B is a pixel section in which multiple reference pixels 110 are arranged in a matrix of rows and columns. The reference pixel section 12B is disposed in a corner section of the pixel array section 10B, for example. The reference pixel section 12B is located in the diagonal direction of the imaging pixel section 11. In other words, in the pixel array section 10B, the imaging pixel section 11 and the reference pixel section 12B are arranged along the diagonal direction.

Hereinafter, for the sake of distinction, a reference pixel 110 included in the reference pixel section 12 may be referred to as a "reference pixel 110A", a reference pixels 110 included in the reference pixel section 12A may be referred to as a "reference pixel 110B", and a reference pixel 110 included in the reference pixel section 12B may be referred to as a "reference pixel 110C". In the present embodiment, the reference pixel 110A is an example of a second pixel, the reference pixel 110B is an example of a third pixel, and the reference pixel 110C is an example of a fourth pixel. Also, in the following, a reset signal outputted by the reference pixel 110A may be referred to as a "first reset signal", a reset signal outputted by the reference pixel 110B may be referred to as a "second reset signal", and a reset signal outputted by the reference pixel 110C may be referred to as a "third reset signal".

In the pixel array section 10B, multiple reference pixels 110C are arranged in a matrix of rows and columns so as to be located in the same columns as the reference pixel columns in the reference pixel section 12 and in the same rows as the reference pixel rows in the reference pixel section 12A. In other words, each of the multiple reference pixels 110C is located in the same column as one of the multiple reference pixels 110A and in the same row as one of the multiple reference pixels 110B. The reference pixels 110C located in the same columns as the reference pixel columns are also connected to the vertical signal line 22 corresponding to each reference pixel column connected to the reference pixels 110A. The reference pixels 110C located in the same rows as the reference pixel rows are also connected to the scanning line 24 corresponding to each reference pixel row connected to the reference pixels 110B.

The reference signal generator 180 is connected to the vertical signal line 25 and the output signal line 23. The signals outputted by the reference pixels 110A and 110C are outputted to the column signal processor 50 via the reference signal generator 180.

The output signal line 23 outputs, as the output from the reference signal generator 180, the difference between the output of the reference pixel 110A in the reference pixel section 12 located in the horizontal direction of the imaging pixel section 11 and the output of the reference pixel 110C in the reference pixel section 12B located in the diagonal direction of the imaging pixel section 11.

The capacitive element 190 is disposed in correspondence with the vertical signal line 22 in each pixel column in the imaging pixel section 11. One end of the capacitive element 190 is connected to the output signal line 23. The other end of the capacitive element 190 is connected to the column signal processor 50.

Figure 19:
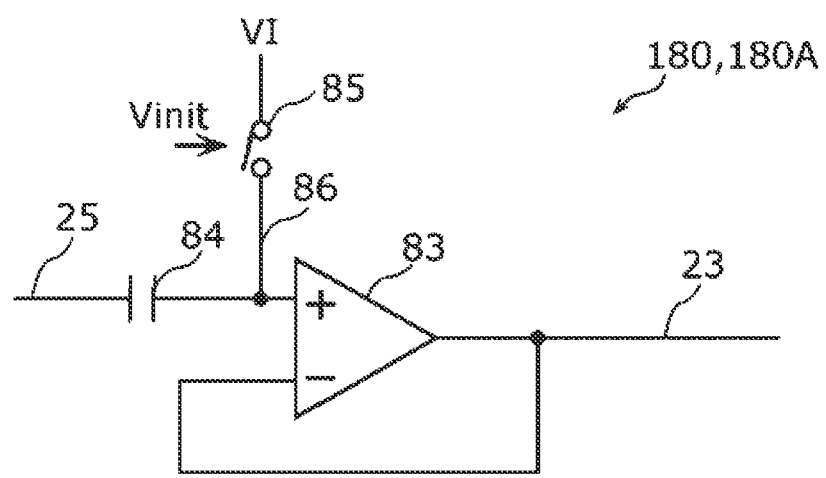
FIG. 19 is a diagram illustrating an example of the circuit configuration of a reference signal generator according to Embodiment 7.

A case in which the reference signal generator 180 is a differential output circuit 180A will be described as an example of the circuit configuration of the reference signal generator 180. FIG. 19 is a diagram illustrating an example of the circuit configuration of the reference signal generator according to the present embodiment. The differential output circuit 180A outputs the difference between a reset signal outputted by the reference pixel 110A and a reset signal outputted by the reference pixel 110C, for example.

As illustrated in FIG. 19, the differential output circuit 180A differs from the buffer circuit 80A illustrated in FIG. 9 by including a capacitive element 84 and a switch 85 instead of the switch 81 and the capacitive element 82.

The capacitive element 84 is located on the connection path between the vertical signal line 25 and the amplifier 83, where signals from the reference pixel 110A and the reference pixel 110C are outputted. One end of the capacitive element 84 is connected to the vertical signal line 25. The other end of the capacitive element 84 is connected to a non-inverting input terminal of the amplifier 83 and the switch 85. The switch 85 toggles the input and cutoff of a power supply voltage VI to a node 86 between the amplifier 83 and the capacitive element 84. The power supply voltage VI is a voltage for initializing the node 86, and the voltage of the node 86 is set to the power supply voltage VI when the switch 85 is on. The turning on and off of the switch 85 is controlled by a control signal Vinit from the controller 30. For example, the switch 85 is turned on when the control signal Vinit is high level, and the switch 85 is turned off when the control signal Vinit is low level.

Figure 20:
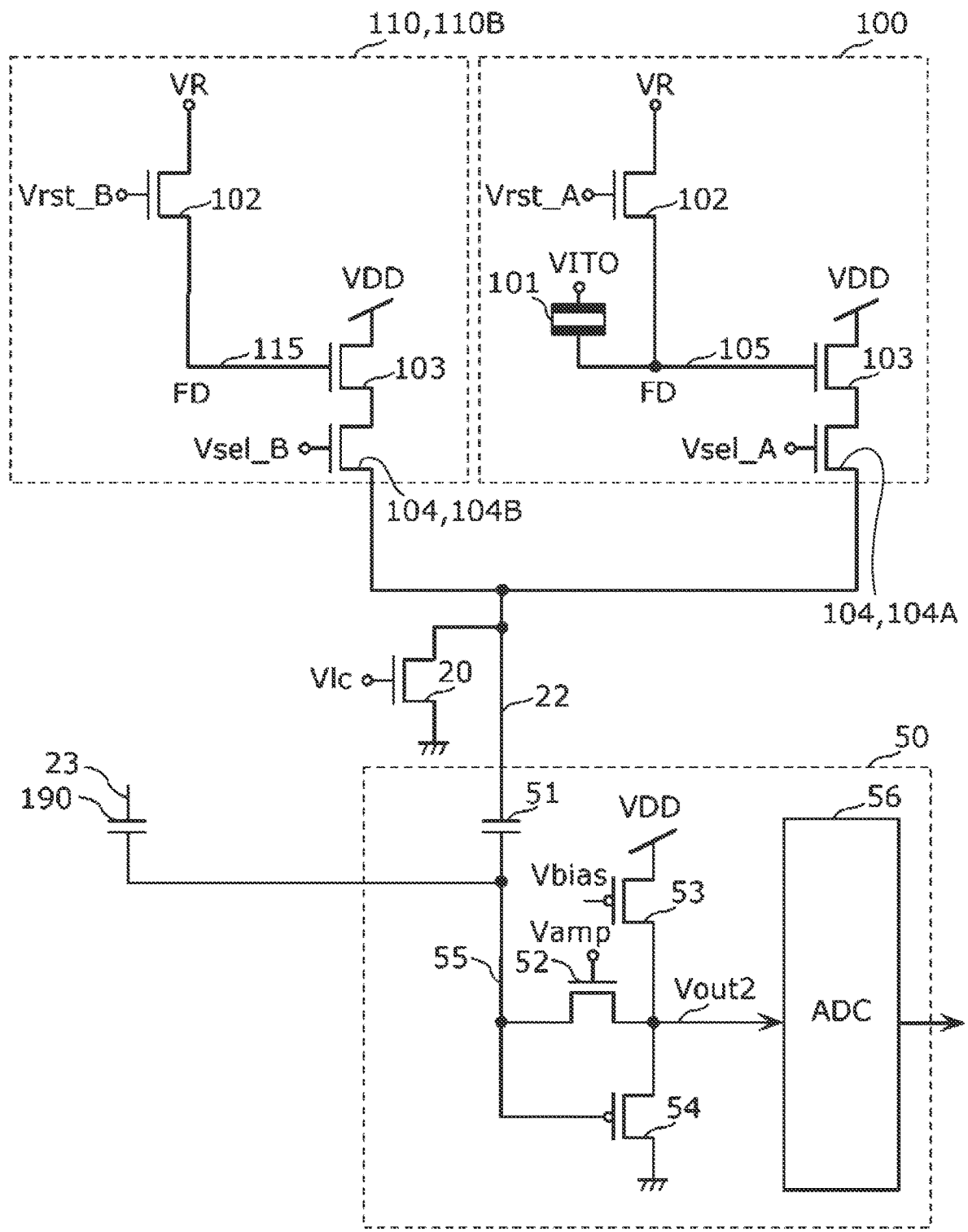
FIG. 20 is a diagram illustrating an example of the circuit configuration from pixels to a column signal processor according to Embodiment 7.
Figure 21:
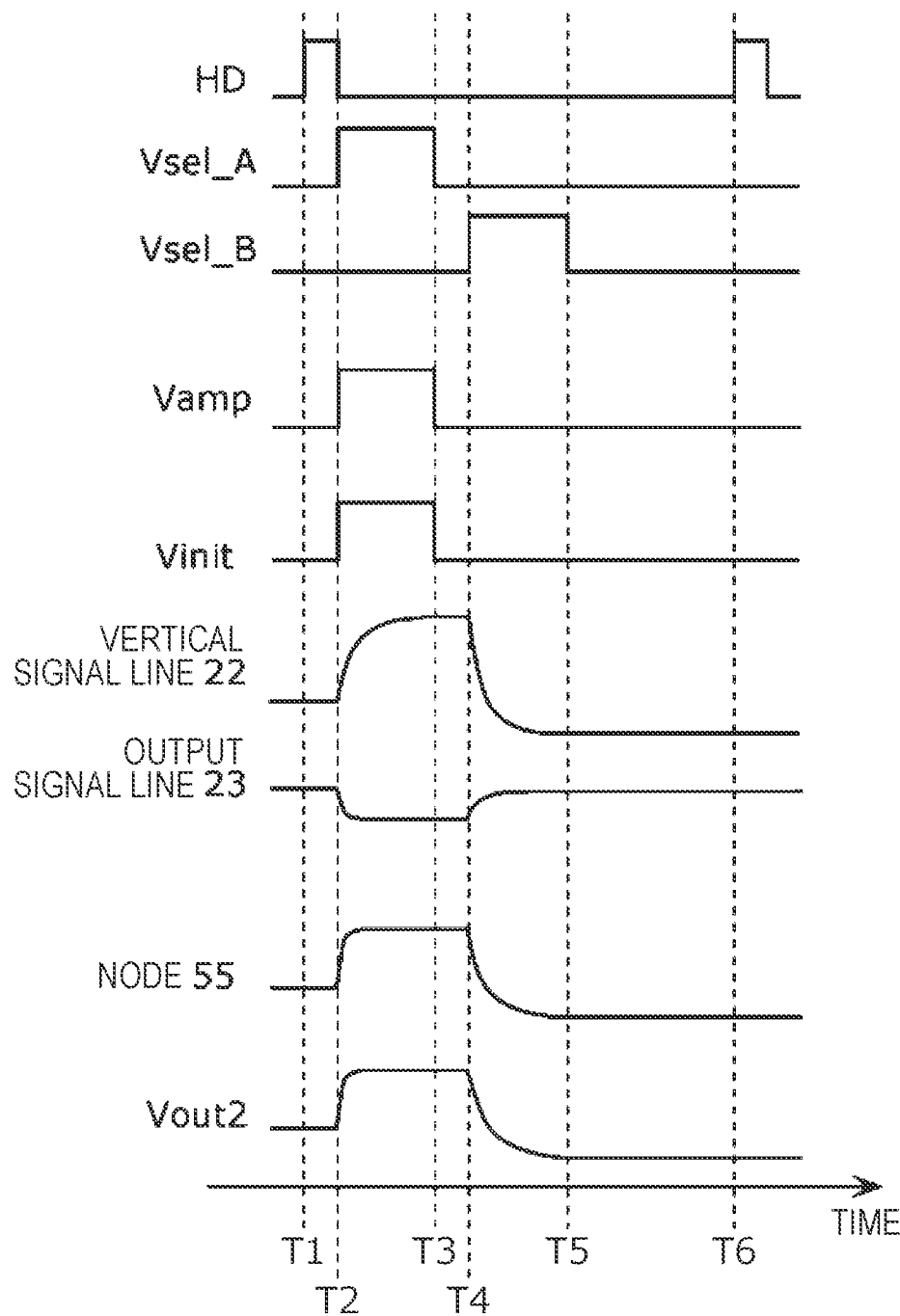
FIG. 21 is a timing chart for explaining an example of the processing of signals in the imaging device according to Embodiment 7.

Specific operations in regard to nondestructive readout in the imaging device 206 according to the present embodiment will be described using the circuit diagrams illustrated in FIGS. 19 and 20 and the timing chart illustrated in FIG. 21. FIG. 20 is a diagram illustrating an example of the circuit configuration from pixels to the column signal processor 50 according to Embodiment 7. FIG. 21 is a timing chart for explaining an example of the processing of signals in the imaging device 206 according to Embodiment 7.

In FIG. 20, circuits upstream of the capacitive element 190, such as the reference signal generator 180, are omitted from illustration. The circuit diagram illustrated in FIG. 20 is the same as the circuit diagram illustrated in FIG. 14, except that the other end of the capacitive element 190 is connected to the node 55.

In the timing chart illustrated in FIG. 21, the voltage levels of the control signal Vinit and the output signal line 23 are illustrated in addition to the items on the timing chart in FIG. 15. The types and operations of other control signals and nodes in FIG. 21 are the same as in the timing chart in FIG. 15, and in the following description, descriptions of duplicate operations will be omitted or simplified.

Operations by the imaging device 206 with the circuit configuration illustrated in FIGS. 19 and 20 will be described using the timing chart in FIG. 21. FIG. 21 illustrates a timing chart of signals and the like involved in nondestructive readout.

In the operations described below, the same select control signal Vsel_A is supplied to the imaging pixel 100 and the reference pixel 110A located in the same row in the pixel array section 10B. The same select control signal Vsel_B is supplied to the reference pixel 110B and the reference pixel 110C located in the same row in the pixel array section 10B.

First, after the horizontal synchronization signal HD goes high at time T1, access to the selected row, that is, the pixel row including the imaging pixel 100 illustrated in FIG. 20, is started.

Next, at time T2, the select control signal Vsel_A is set to high level to turn on the select transistor 104A. At the same time, the control signal Vamp is set to high level to turn on the transistor 52. This causes the pixel signal of the imaging pixel 100 to be outputted to the vertical signal line 22. Also, the voltage of the node 55 goes to a predetermined initial voltage. The voltage on the vertical signal line 22 changes from the voltage state at time T1 and converges on a voltage corresponding to the level of the pixel signal of the imaging pixel 100. Also, the voltage of the node Vout2 changes from the voltage state at time T1 and converges on an equilibrium-state voltage when the transistor 52 is turned on.

In addition, when the select control signal Vsel_A is set to high level, the select transistor 104 of the reference pixel 110A located in the same row as the imaging pixel 100 also turns on at the same time. At time T2, the control signal Vinit is set to high level to turn on the switch 85. This causes the first reset signal of the reference pixel 110A to be outputted to the vertical signal line 25, and causes the voltage of the node 86 to be reset to the power supply voltage VI.

Since the amplifier 83 is a unity gain buffer configuration that feeds back the output to the inverting input terminal, at time T2, a voltage which is the same as the voltage of the node 86 is outputted to the output signal line 23.

Next, at time T3, the select control signal Vsel_A, the control signal Vamp, and the control signal Vinit are set to low level to turn off the select transistor 104A, the transistor 52, and the switch 85.

Thereafter, at time T4, the select control signal Vsel_B is set to high level to turn on the select transistor 104B. This causes the second reset signal of the reference pixel 110B to be outputted to the vertical signal line 22. The voltage on the vertical signal line 22 changes from a voltage corresponding to the level of the pixel signal of the imaging pixel 100 and converges on a voltage corresponding to the level of the second reset signal of the reference pixel 110B. In response, the voltage of the node 55 changes via the capacitive element 51, and voltage of the node Vout2 changes.

In addition, when the select control signal Vsel_B is set to high level, the select transistor 104 of the reference pixel 110C located in the same row as the reference pixel 110B also turns on at the same time. This causes the third reset signal of the reference pixel 110C to be outputted to the vertical signal line 25.

At time T4, the switch 85 is in the off state, and therefore the node 86 is in the floating state. According, when the voltage on the vertical signal line 25 changes, the change is transmitted to the node 86 via the capacitive element 84. Since the amplifier 83 is a unity gain buffer configuration that feeds back the output to the inverting input terminal, a voltage which is the same as the voltage of the node 86 is outputted to the output signal line 23.

From time T2 to time T3 during which the select control signal Vsel_A is in the on state, the voltage on the vertical signal line 25 is the output voltage of the reference pixel 110A located in the same row as the imaging pixel 100. Also, from time T4 to time T5 during which the select control signal Vsel_B is in the on state, the voltage on the vertical signal line 25 is the output voltage of the reference pixel 110C located in the same row as the reference pixel 110B, or in other words, the output of the pixel at the end of the pixels in the vertical direction. Therefore, the difference in the signal voltages is the difference in voltage after a reset operation due to the difference in the pixel position in the vertical direction. Since the voltage difference on the output signal line 23 is transmitted to the node 55 via the capacitive element 190, the difference in reset voltage due to the difference in the pixel position in the vertical direction is transmitted to the node 55. In other words, in response to the voltage difference, the voltage of the node 55 changes via the capacitive element 190, and voltage of the node Vout2 changes. This removes the influence of the difference in voltage after a reset operation due to the difference in the pixel position in the vertical direction from the node 55 and the node Vout2. The operations thus far cause a voltage to be outputted to the node 55 and the node Vout2, the voltage being obtained by adding a voltage corresponding to the output voltage difference between the reference pixel 110A and the reference pixel 110C to a voltage corresponding to the output voltage difference between the imaging pixel 100 and the reference pixel 110B.

Next, at time T5, the select control signal Vsel_B is set to low level to turn off the select transistor 104B, which causes the voltages of the node 55 and the node Vout2 to be retained, and an AD conversion process is performed by the downstream ADC circuit 56. In this way, the column signal processor 50 outputs the difference between the pixel signal outputted by an imaging pixel 100 and a reference signal. In the present operations, the reference signal is a signal based on the first reset signal outputted by a reference pixel 110A located in the same row as the imaging pixel 100, the second reset signal outputted by a reference pixel 110B located in the same row as the imaging pixel 100, and the third reset signal outputted by a reference pixel 110C located in the same row as the reference pixel 110A and in the same column as the reference pixel 110B. More specifically, the reference signal is a signal obtained by adding the voltage corresponding to the second reset signal to the difference between the voltage corresponding to the first reset signal and the voltage corresponding to the third reset signal.

Thereafter, at time T6, the next pulse of the horizontal synchronization signal HD is issued, and the selected row shifts to the next row.

As above, in nondestructive readout in the present embodiment, a voltage corresponding to the output signal of the reference pixel 110B in the same column as the imaging pixel 100 is used as the reference voltage of the signal level. Furthermore, the influence due to the difference between the output signals of the reference pixel 110A in the same row as the imaging pixel 100 and the reference pixel 110C in the same row as the reference pixel 110B is removed from the reference voltage as the influence due to the difference in voltage after a reset operation due to the difference in the pixel position in the vertical direction. This can allow the reference voltage to simulate the voltage after the reset operation of the imaging pixel 100 while accounting for the differences in the pixel position in the vertical and horizontal directions, thereby reducing the decrease in signal amplitude and the addition of an unwanted offset component. Moreover, by providing the reference pixel 110A and the reference pixel 110B, providing multiple columns of reference pixels 110A, and providing multiple rows of reference pixels 110B, the influence of faults in the reference pixels 110A and/or reference pixels 110B is reduced.

Embodiment 8

The following describes an imaging device according to Embodiment 8. In the following description of Embodiment 8, the differences from Embodiments 1 to 7 will be described primarily, while description of the commonalities will be omitted or simplified.

Figure 22:
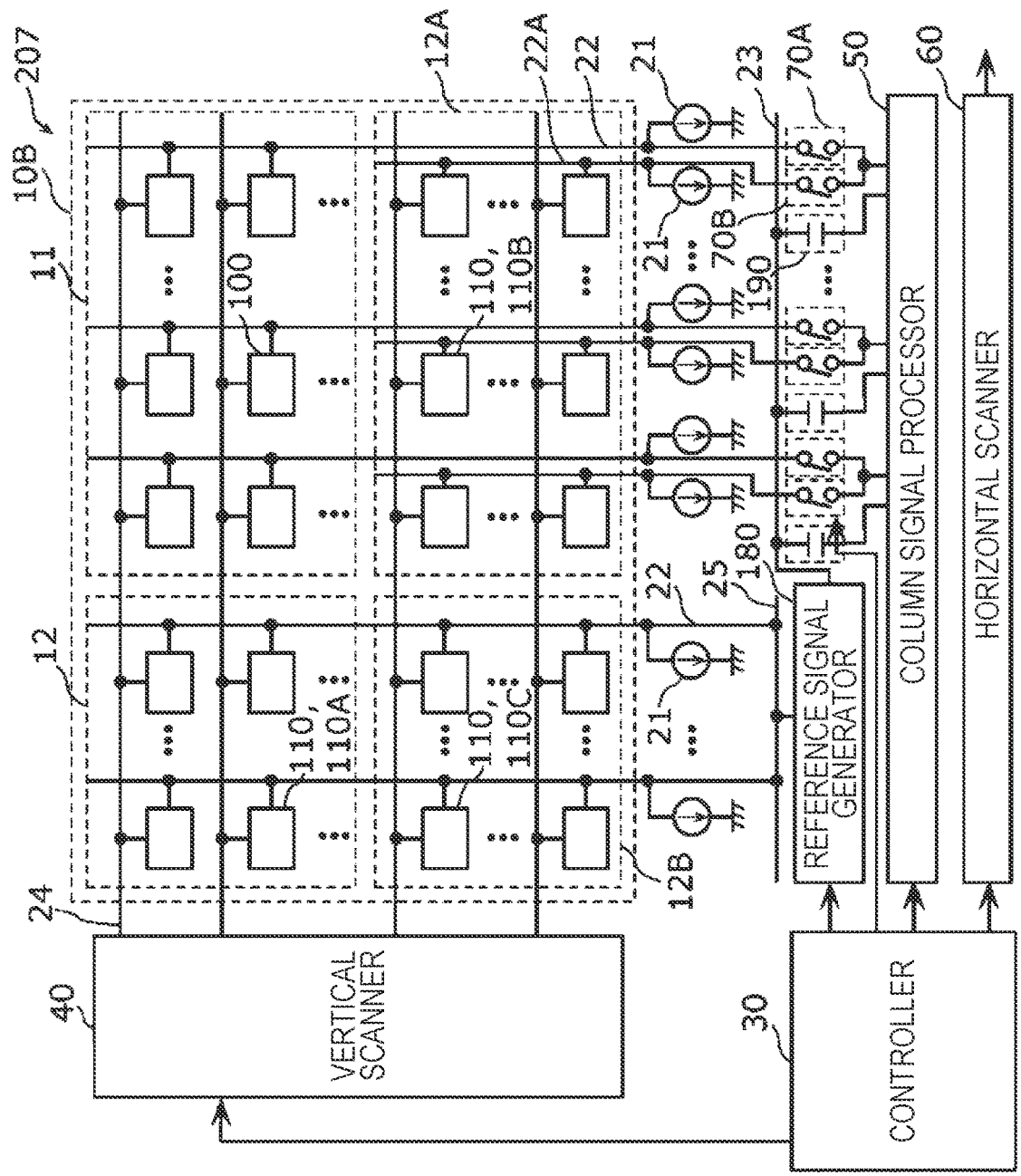
FIG. 22 is a block diagram illustrating an overall configuration of an imaging device according to Embodiment 8.

FIG. 22 is a block diagram illustrating an overall configuration structure of an imaging device 207 according to Embodiment 8. As illustrated in FIG. 22, the imaging device 207 according to the present embodiment differs from the imaging device 206 according to Embodiment 7 in that the reference pixels 110B in the reference pixel section 12A are connected to a vertical signal line 22A different from the vertical signal line 22 connected to the imaging pixels 100 in the imaging pixel section 11, and by being further provided with the first switch section 70A and the second switch section 70B. The connection configuration of the imaging pixel section 11, reference pixel section 12A, vertical signal line 22, vertical signal line 22A, first switch section 70A, and second switch section 70B is similar to that of the imaging device 204 according to Embodiment 5. According to such a configuration the effects of both Embodiment 5 and Embodiment 7 can be obtained with the imaging device 207. In other words, in the imaging device 207, a speedup in nondestructive readout is possible, and the reference voltage can simulate the voltage after the reset operation of the imaging pixel 100 while accounting for the differences in the pixel position in the vertical and horizontal directions, thereby reducing the decrease in signal amplitude and the addition of an unwanted offset component.

Other Embodiments

The foregoing describes an imaging device according to the present disclosure on the basis of embodiments, but the present disclosure is not limited to the above embodiments.

For example, in the above embodiments, the reference pixel section is provided at one end of the pixel array section in the row direction, specifically at the left end, or at one end of the pixel array section in the column direction, specifically at the bottom end. However, the placement of the reference pixel section is not limited thereto.

Figure 23A:
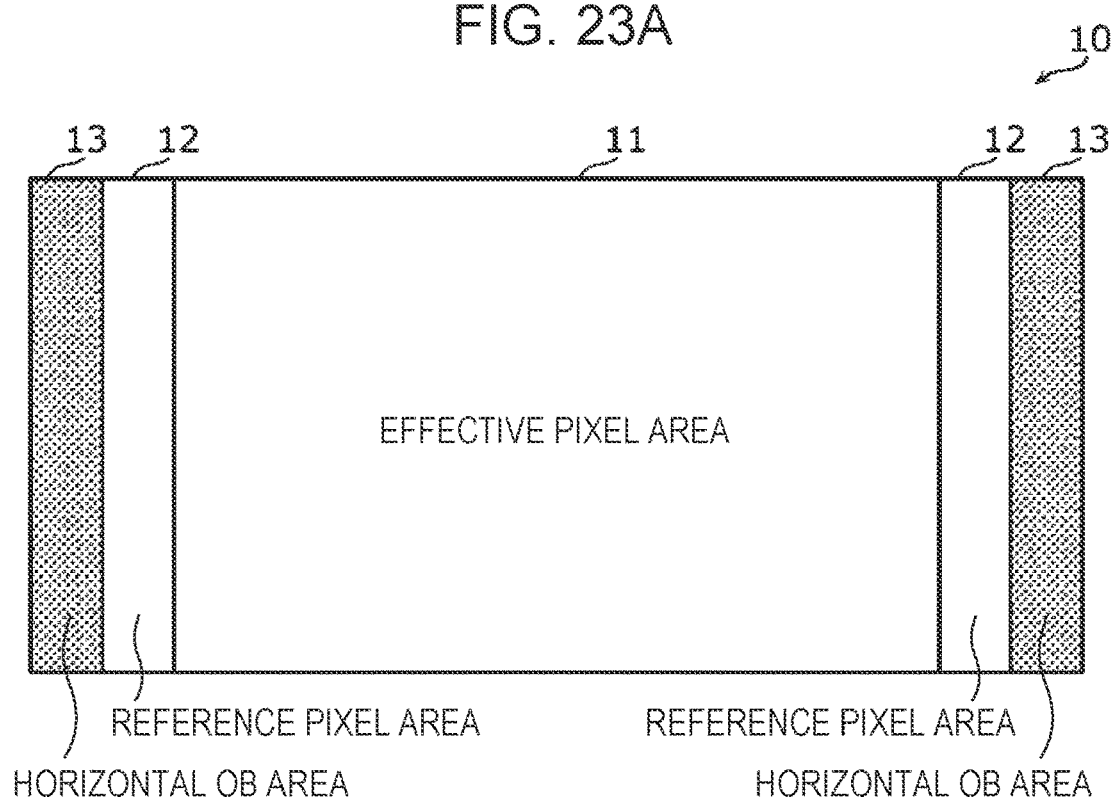
FIG. 23A is a layout diagram illustrating an example of a case in which reference pixel sections are arranged in the horizontal direction of an imaging pixel section.
Figure 23B:
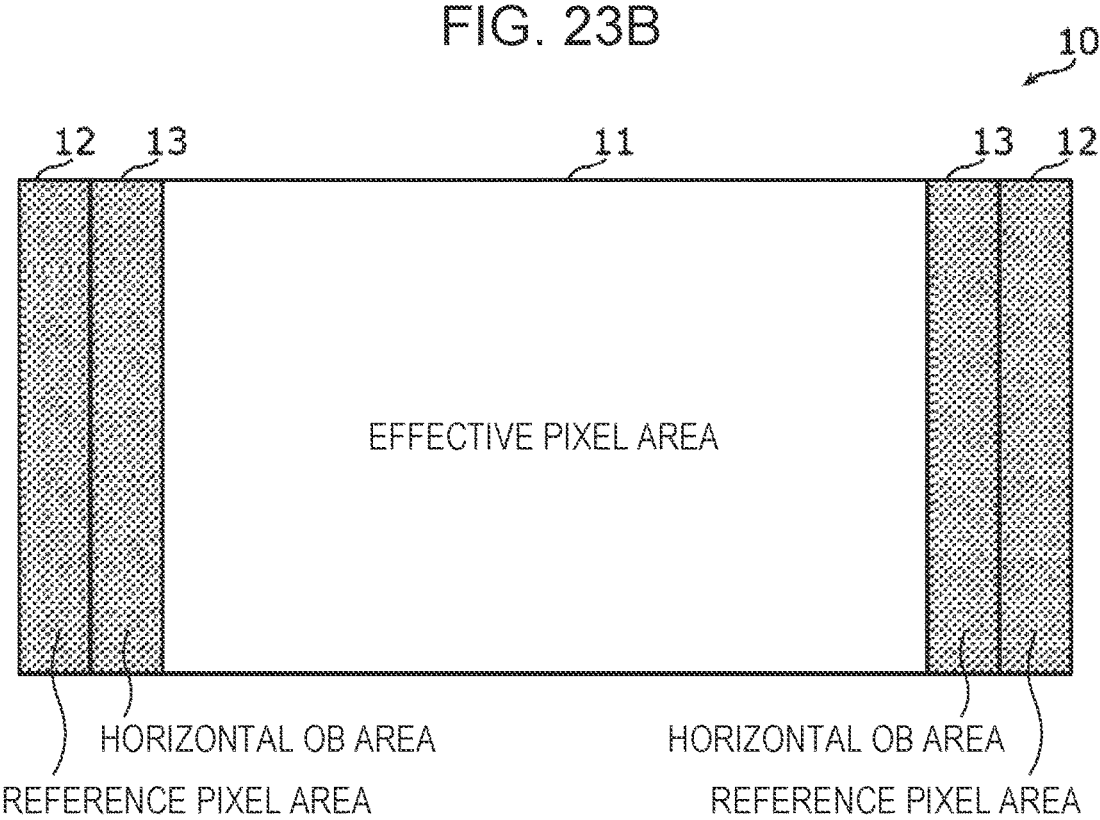
FIG. 23B is a layout diagram illustrating a different example of a case in which reference pixel sections are arranged in the horizontal direction of an imaging pixel section.

FIGS. 23A and 23B are layout diagrams illustrating examples of the case in which reference pixel sections are arranged in the horizontal direction of the imaging pixel section. In FIGS. 23A and 23B, areas provided with a light-shielding layer are shaded with a dot pattern. For example, as illustrated in FIGS. 23A and 23B, reference pixel sections 12 may be arranged both to the left and to the right of the imaging pixel section 11, or in other words, on both sides in the horizontal direction. The imaging pixel section 11 is also referred to as the "effective pixel area". The reference pixel section 12 is also referred to as the "reference pixel area".

The pixel array section 10 may also include horizontal OB pixel sections 13 containing multiple OB pixels. The horizontal OB pixel sections 13 are also referred to as the "horizontal OB areas". OB pixels are used as a reference for black color, for example. As illustrated in FIG. 23A, the reference pixel sections 12 may be disposed between the horizontal OB pixel sections 13 and the imaging pixel section 11. In this case, for example, the reference pixel sections 12 are not provided with a light-shielding layer, and the reference pixels 110 have a configuration that does not include the photoelectric conversion element 101. As illustrated in FIG. 23B, the reference pixel sections 12 may also be disposed in the area farther outward than the horizontal OB pixel sections 13, such that the horizontal OB pixel sections 13 are arranged between the reference pixel sections 12 and the imaging pixel section 11 in the horizontal direction. In this case, for example, the reference pixel sections 12 are provided with a light-shielding layer, and the reference pixels 110 have a configuration that includes the light-shielding layer and the photoelectric conversion element 101.

Figure 24A:
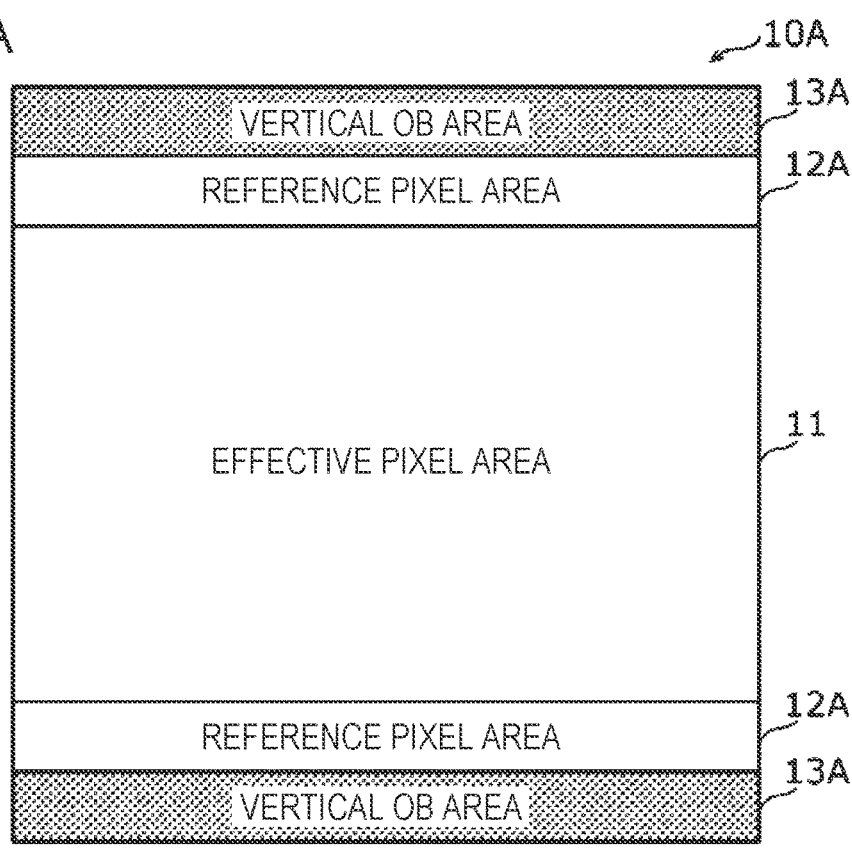
FIG. 24A is a layout diagram illustrating an example of a case in which reference pixel sections are arranged in the vertical direction of an imaging pixel section.
Figure 24B:
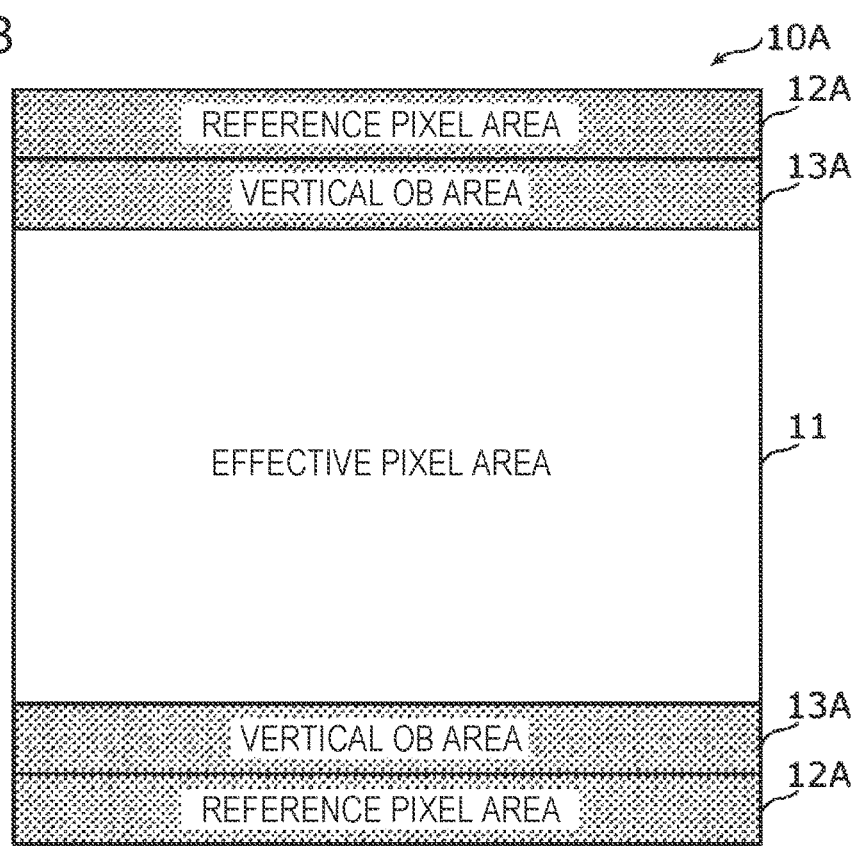
FIG. 24B is a layout diagram illustrating a different example of a case in which reference pixel sections are arranged in the vertical direction of an imaging pixel section.

FIGS. 24A and 24B are layout diagrams illustrating examples of the case in which reference pixel sections are arranged in the vertical direction of the imaging pixel section. In FIGS. 24A and 24B, areas provided with a light-shielding layer are shaded with a dot pattern. As illustrated in FIGS. 24A and 24B, reference pixel sections 12A may be arranged from above and below the imaging pixel section 11, or in other words, on both sides in the vertical direction, for example.

The pixel array section 10A may also include vertical OB pixel sections 13A containing multiple OB pixels. The vertical OB pixel sections 13A are also referred to as the "vertical OB areas". As illustrated in FIG. 24A, the reference pixel sections 12A may be disposed between the vertical OB pixel sections 13A and the imaging pixel section 11. In this case, for example, the reference pixel sections 12A are not provided with a light-shielding layer, and the reference pixels 110 have a configuration that does not include the photoelectric conversion element 101. As illustrated in FIG. 24B, the reference pixel sections 12A may also be disposed farther outward than the vertical OB pixel sections 13A, such that the vertical OB pixel sections 13A are arranged between the reference pixel sections 12A and the imaging pixel section 11 in the vertical direction. In this case, for example, the reference pixel sections 12A are provided with a light-shielding layer, and the reference pixels 110 have a configuration that includes the light-shielding layer and the photoelectric conversion element 101.

In this way, providing reference pixel areas on both sides of the effective pixel area in the horizontal or vertical direction allows for effective use of both ends of the pixel array section, which are difficult to use as the effective pixel area due to reduced accuracy of pixel signals.

Note that in the examples illustrated in FIGS. 23A and 24A, a light-shielding layer may also be provided in the reference pixel sections 12 and the reference pixel sections 12A, and the reference pixels 110 may also be configured to include the photoelectric conversion element 101.

In the examples illustrated in FIGS. 23A and 23B, the reference pixel section 12 and the horizontal OB pixel section 13 may also be disposed on only one of the two sides of the imaging pixel section 11 in the horizontal direction. Similarly, in the examples illustrated in FIGS. 24A and 24B, the reference pixel section 12A and the vertical OB pixel section 13A may also be disposed on only one of the two sides of the imaging pixel section 11 in the vertical direction.

Additionally, for example, in the above embodiments, a difference signal is outputted by outputting a pixel signal first and then outputting a reference signal based on a reset signal, but the configuration is not limited thereto. A difference signal may also be outputted by outputting a reference signal based on a reset signal first and then outputting a pixel signal. For example, in the operations described using FIG. 7, the periods in which the control signal Vs and the control signal Vn go to high level may be interchanged. Also, in the operations described using FIGS. 15 and 21, the periods in which the select control signal Vsel_A and the select control signal Vsel_B go to high level may be interchanged.

Additionally, for example, in the above embodiments, the reference pixel section 12 includes at least two reference pixel columns, but is not limited thereto. Also, the reference pixel section 12A includes at least two reference pixel rows, but is not limited thereto. The number of reference pixel columns that the reference pixel section 12 includes may also be one column. The number of reference pixel rows that the reference pixel section 12A includes may also be one row. The number of reference pixels 110C that the reference pixel section 12B includes may also be one.

Additionally, for example, in Embodiment 7 and Embodiment 8 above, the pixel array section 10B includes the reference pixel section 12B, but is not limited thereto. The pixel array section 10B need not include the reference pixel section 12B. In this case, the column signal processor 50 outputs the difference between the pixel signal outputted by an imaging pixel 100 and a reference signal based on a first reset signal outputted by a reference pixel 110A located in the same row as the imaging pixel 100 and a second reset signal outputted by a reference pixel 110B located in the same column as the imaging pixel 100. The reference signal is the combined signal of the first and second reset signals, or one signal selected from the first and second reset signals, for example. This allows for the generation of a reference signal in which the influence of pixel position is lessened, and even if there is a defect in the reference pixel 110A or the reference pixel 110B, the influence of the defect on the reference signal can be reduced.

Otherwise, embodiments obtained by applying various modifications that may occur to a person skilled in the art without departing from the gist of the present disclosure are also included within the scope of the present disclosure. Furthermore, the structural elements in multiple embodiments may also be freely combined without departing from the gist of the disclosure.

An imaging device according to the present disclosure is useful as any of various types of imaging devices. An imaging device according to the present disclosure can also be applied to digital cameras, digital video cameras, camera-equipped mobile phones, electronic endoscopes and other medical cameras, vehicle-mounted cameras, cameras for robots, and other applications.

What is claimed is:
1. An imaging device comprising:
  a plurality of pixels arranged in a matrix of rows and columns; and
  a signal processing circuit,
  the plurality of pixels including:
    a plurality of first pixels that each output a pixel signal corresponding to incident light; and
    a plurality of second pixels which are aligned in the column direction in at least two columns and which each output a reset signal corresponding to the output signal at reset of each of the plurality of first pixels, the plurality of second pixels being arranged in different columns from the plurality of first pixels, wherein
  the signal processing circuit performs AD conversion of a difference signal between the pixel signal outputted by one first pixel from among the plurality of first pixels and a reference signal based on the reset signals outputted by at least two second pixels, from among the plurality of second pixels, located in the same row as the one first pixel.

2. The imaging device according to claim 1, wherein the reset signals outputted by the at least two second pixels are combined and outputted to the signal processing circuit.

3. The imaging device according to claim 1, further comprising:
a selector circuit electrically connected to the at least two second pixels, wherein
the selector circuit selects and outputs to the signal processing circuit at least one of the reset signals outputted by the at least two second pixels.

4. The imaging device according to claim 1, further comprising:
a buffer circuit provided downstream of the at least two second pixels and upstream of the signal processing circuit.

5. The imaging device according to claim 1, further comprising:
an offset circuit provided downstream of the at least two second pixels and upstream of the signal processing circuit, wherein
the offset circuit outputs a signal obtained by adding a positive or negative voltage to an inputted signal to the signal processing circuit as the reference signal.

6. The imaging device according to claim 1, wherein each of the plurality of pixels includes a photoelectric converter that converts light into signal charge, and
each of the second pixels includes a light shield that blocks light from entering the photoelectric converter.

7. The imaging device according to claim 1, wherein each of the first pixels includes a photoelectric converter that converts light into signal charge, and
each of the second pixels does not include a photoelectric converter that converts light into signal charge.

8. An imaging device comprising:
a plurality of pixels arranged in a matrix of rows and columns; and
a signal processing circuit,
the plurality of pixels including:
a plurality of first pixels that each output a pixel signal corresponding to incident light; and
a plurality of second pixels which are aligned in the column direction in at least two columns and which each output a reset signal corresponding to the output signal at reset of each of the plurality of first pixels, the plurality of second pixels being arranged in different columns from the plurality of first pixels, wherein:
the signal processing circuit outputs a difference between the pixel signal outputted by one first pixel from among the plurality of first pixels and a reference signal based on the reset signals outputted by at least two second pixels, from among the plurality of second pixels, located in the same row as the one first pixel,
the imaging device further comprises at least two signal lines corresponding respectively to the at least two columns,
each of the at least two second pixels outputs the reset signal to the corresponding one of the at least two signal lines, and
the plurality of signal lines are connected to each other.

9. An imaging device comprising:
a plurality of pixels arranged in a matrix of rows and columns; and
a signal processing circuit,
the plurality of pixels including:
a plurality of first pixels that each output a pixel signal corresponding to incident light;
a plurality of second pixels which are aligned in the column direction in at least one column and which each output a first reset signal corresponding to the output signal at reset of each of the plurality of first pixels, the plurality of second pixels being arranged in a different column from the plurality of first pixels; and
a plurality of third pixels which are aligned in the row direction in at least one row and which each output a second reset signal corresponding to the output signal at reset of each of the plurality of first pixels, the plurality of third pixels being arranged in a different row from the plurality of first pixels, wherein
the signal processing circuit performs AD conversion of a difference signal between the pixel signal outputted by one first pixel from among the plurality of first pixels and a reference signal based on the first reset signal outputted by at least one second pixel, from among the plurality of second pixels, located in the same row as the one first pixel and the second reset signal outputted by at least one third pixel, from among the plurality of third pixels, located in the same column as the one first pixel.

10. The imaging device according to claim 9, wherein the plurality of pixels further include at least one fourth pixel which is located in the same column as the at least one second pixel and in the same row as the at least one third pixel, and which outputs a third reset signal corresponding to the output signal at reset of each of the plurality of first pixels, and
the signal processing circuit outputs the AD converted difference signal between the pixel signal outputted by the one first pixel and a reference signal based on the first reset signal outputted by the at least one second pixel, the second reset signal outputted by the at least one third pixel, and the third reset signal outputted by the at least one fourth pixel.

* * * * *